(12) United States Patent
Bugwadia et al.

(10) Patent No.: US 8,966,018 B2
(45) Date of Patent: Feb. 24, 2015

(54) AUTOMATED NETWORK DEVICE CONFIGURATION AND NETWORK DEPLOYMENT

(75) Inventors: Jamsheed Bugwadia, San Jose, CA (US); Yun Freund, Cupertino, CA (US); Paul E. Zeldin, Los Altos, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 478 days.

(21) Appl. No.: 12/683,281

(22) Filed: Jan. 6, 2010

(65) Prior Publication Data

US 2010/0180016 A1    Jul. 15, 2010

Related U.S. Application Data

(63) Continuation-in-part of application No. 11/437,582, filed on May 19, 2006, now abandoned.

(51) Int. Cl.
| | |
|---|---|
| G06F 15/177 | (2006.01) |
| H04W 24/02 | (2009.01) |
| G06F 9/44 | (2006.01) |
| H04L 12/24 | (2006.01) |
| G06F 9/445 | (2006.01) |
| H04W 84/12 | (2009.01) |
| H04W 88/12 | (2009.01) |

(52) U.S. Cl.
CPC ............ *H04W 24/02* (2013.01); *G06F 9/4411* (2013.01); *H04L 41/0806* (2013.01); *H04L 41/0856* (2013.01); *H04L 41/0869* (2013.01); *H04L 41/0886* (2013.01); *G06F 9/44505* (2013.01); *H04L 41/0893* (2013.01); *H04L 41/22* (2013.01); *H04W 84/12* (2013.01); *H04W 88/12* (2013.01)

USPC .......................................... 709/220; 709/223

(58) Field of Classification Search
USPC ........................................ 709/220, 223, 203
See application file for complete search history.

(56) References Cited

U.S. PATENT DOCUMENTS

| | | | |
|---|---|---|---|
| 3,641,433 | A | 2/1972 | Mifflin et al. |
| 3,906,166 | A | 9/1975 | Cooper et al. |

(Continued)

FOREIGN PATENT DOCUMENTS

| | | |
|---|---|---|
| EP | 0 992 921 A2 | 4/2000 |
| EP | 1445893 | 8/2004 |

(Continued)

OTHER PUBLICATIONS

International Search Report PCT/US2007/012195 dated Mar. 19, 2008.

(Continued)

*Primary Examiner* — Philip B Tran

(57) ABSTRACT

Automatically configuring network device, network system architecture, and method for configuring one or a plurality of devices on a network. Device and network system architectures and methods for automatically self-initiating and configuring one, a plurality, or hundreds of wired or wireless network devices. Autoconfiguring wireless Local Area Network switch and access point devices connected to the switch. Method for accessing remote server by a device to acquire device configuration information. Method for deploying a network including at least one network device at a facility without the participation of a person having knowledge of networks or network devices at the facility. Computer program and computer program product.

19 Claims, 7 Drawing Sheets

(56) References Cited

U.S. PATENT DOCUMENTS

| | | | |
|---|---|---|---|
| 4,168,400 | A | 9/1979 | de Couasnon et al. |
| 4,176,316 | A | 11/1979 | DeRosa et al. |
| 4,247,908 | A | 1/1981 | Lockhart, Jr. et al. |
| 4,291,401 | A | 9/1981 | Bachmann |
| 4,291,409 | A | 9/1981 | Weinberg et al. |
| 4,409,470 | A | 10/1983 | Shepard et al. |
| 4,460,120 | A | 7/1984 | Shepard et al. |
| 4,475,208 | A | 10/1984 | Ricketts |
| 4,494,238 | A | 1/1985 | Groth, Jr. |
| 4,500,987 | A | 2/1985 | Hasegawa |
| 4,503,533 | A | 3/1985 | Tobagi et al. |
| 4,550,414 | A | 10/1985 | Guinon et al. |
| 4,562,415 | A | 12/1985 | McBiles |
| 4,630,264 | A | 12/1986 | Wah et al. |
| 4,635,221 | A | 1/1987 | Kerr |
| 4,639,914 | A | 1/1987 | Winters |
| 4,644,523 | A | 2/1987 | Horwitz |
| 4,672,658 | A | 6/1987 | Kavehrad et al. |
| 4,673,805 | A | 6/1987 | Shepard et al. |
| 4,707,839 | A | 11/1987 | Andren et al. |
| 4,730,340 | A | 3/1988 | Frazier, Jr. |
| 4,736,095 | A | 4/1988 | Shepard et al. |
| 4,740,792 | A | 4/1988 | Sagey et al. |
| 4,758,717 | A | 7/1988 | Shepard et al. |
| 4,760,586 | A | 7/1988 | Takeda |
| 4,789,983 | A | 12/1988 | Acampora et al. |
| 4,829,540 | A | 5/1989 | Waggener, Sr. et al. |
| 4,850,009 | A | 7/1989 | Zook et al. |
| 4,872,182 | A | 10/1989 | McRae et al. |
| 4,894,842 | A | 1/1990 | Broekhoven et al. |
| 4,901,307 | A | 2/1990 | Gilhousen et al. |
| 4,933,952 | A | 6/1990 | Albrieux et al. |
| 4,933,953 | A | 6/1990 | Yagi |
| 4,955,053 | A | 9/1990 | Siegmund |
| 4,995,053 | A | 2/1991 | Simpson et al. |
| 5,008,899 | A | 4/1991 | Yamamoto |
| 5,027,343 | A | 6/1991 | Chan et al. |
| 5,029,183 | A | 7/1991 | Tymes |
| 5,103,459 | A | 4/1992 | Gilhousen et al. |
| 5,103,461 | A | 4/1992 | Tymes |
| 5,109,390 | A | 4/1992 | Gilhousen et al. |
| 5,119,502 | A | 6/1992 | Kallin et al. |
| 5,142,550 | A | 8/1992 | Tymes |
| 5,151,919 | A | 9/1992 | Dent |
| 5,157,687 | A | 10/1992 | Tymes |
| 5,187,575 | A | 2/1993 | Lim |
| 5,231,633 | A | 7/1993 | Hluchyj et al. |
| 5,280,498 | A | 1/1994 | Tymes et al. |
| 5,285,494 | A | 2/1994 | Sprecher et al. |
| 5,327,144 | A | 7/1994 | Stilp et al. |
| 5,329,531 | A | 7/1994 | Diepstraten et al. |
| 5,339,316 | A | 8/1994 | Diepstraten |
| 5,371,783 | A | 12/1994 | Rose et al. |
| 5,418,812 | A | 5/1995 | Reyes et al. |
| 5,432,842 | A | 7/1995 | Kinoshita |
| 5,444,851 | A | 8/1995 | Woest |
| 5,448,569 | A | 9/1995 | Huang et al. |
| 5,450,615 | A | 9/1995 | Fortune et al. |
| 5,465,401 | A | 11/1995 | Thompson |
| 5,479,441 | A | 12/1995 | Tymes et al. |
| 5,483,676 | A | 1/1996 | Mahany et al. |
| 5,488,569 | A | 1/1996 | Kaplan et al. |
| 5,491,644 | A | 2/1996 | Pickering et al. |
| 5,517,495 | A | 5/1996 | Lund et al. |
| 5,519,762 | A | 5/1996 | Bartlett |
| 5,528,621 | A | 6/1996 | Heiman et al. |
| 5,542,100 | A | 7/1996 | Hatakeyama |
| 5,546,389 | A | 8/1996 | Wippenbeck et al. |
| 5,561,841 | A | 10/1996 | Markus |
| 5,568,513 | A | 10/1996 | Croft et al. |
| 5,570,366 | A | 10/1996 | Baker et al. |
| 5,584,048 | A | 12/1996 | Wieczorek |
| 5,598,532 | A | 1/1997 | Liron |
| 5,604,869 | A | 2/1997 | Mincher et al. |
| 5,630,207 | A | 5/1997 | Gitlin et al. |
| 5,640,414 | A | 6/1997 | Blakeney, II et al. |
| 5,649,289 | A | 7/1997 | Wang et al. |
| 5,668,803 | A | 9/1997 | Tymes et al. |
| 5,670,964 | A | 9/1997 | Dent |
| 5,677,954 | A | 10/1997 | Hirata et al. |
| 5,706,428 | A | 1/1998 | Boer et al. |
| 5,715,304 | A | 2/1998 | Nishida et al. |
| 5,729,542 | A | 3/1998 | Dupont |
| 5,734,699 | A | 3/1998 | Lu et al. |
| 5,742,592 | A | 4/1998 | Scholefield et al. |
| 5,774,460 | A | 6/1998 | Schiffel et al. |
| 5,793,303 | A | 8/1998 | Koga |
| 5,794,128 | A | 8/1998 | Brockel et al. |
| 5,796,839 | A | 8/1998 | Ishiguro |
| 5,812,589 | A | 9/1998 | Sealander et al. |
| 5,815,811 | A | 9/1998 | Pinard et al. |
| 5,818,385 | A | 10/1998 | Bartholomew |
| 5,828,653 | A | 10/1998 | Goss |
| 5,828,960 | A | 10/1998 | Tang et al. |
| 5,835,061 | A | 11/1998 | Stewart |
| 5,838,907 | A | 11/1998 | Hansen |
| 5,844,900 | A | 12/1998 | Hong et al. |
| 5,852,722 | A | 12/1998 | Hamilton |
| 5,862,475 | A | 1/1999 | Zicker et al. |
| 5,872,968 | A | 2/1999 | Knox et al. |
| 5,875,179 | A | 2/1999 | Tikalsky |
| 5,887,259 | A | 3/1999 | Zicker et al. |
| 5,896,561 | A | 4/1999 | Schrader et al. |
| 5,909,686 | A | 6/1999 | Muller et al. |
| 5,915,214 | A | 6/1999 | Reece et al. |
| 5,920,821 | A | 7/1999 | Seazholtz et al. |
| 5,933,607 | A | 8/1999 | Tate et al. |
| 5,938,721 | A | 8/1999 | Dussell et al. |
| 5,949,988 | A | 9/1999 | Feisullin et al. |
| 5,953,669 | A | 9/1999 | Stratis et al. |
| 5,960,335 | A | 9/1999 | Umemoto et al. |
| 5,969,678 | A | 10/1999 | Stewart |
| 5,970,066 | A | 10/1999 | Lowry et al. |
| 5,977,913 | A | 11/1999 | Christ |
| 5,980,078 | A | 11/1999 | Krivoshein et al. |
| 5,982,779 | A | 11/1999 | Krishnakumar et al. |
| 5,987,062 | A | 11/1999 | Engwer et al. |
| 5,987,328 | A | 11/1999 | Ephremides et al. |
| 5,991,817 | A | 11/1999 | Rowett et al. |
| 5,999,813 | A | 12/1999 | Lu et al. |
| 6,005,853 | A | 12/1999 | Wang et al. |
| 6,011,784 | A | 1/2000 | Brown et al. |
| 6,012,088 | A | 1/2000 | Li et al. |
| 6,029,196 | A | 2/2000 | Lenz |
| 6,041,240 | A | 3/2000 | McCarthy et al. |
| 6,041,358 | A | 3/2000 | Huang et al. |
| 6,070,243 | A | 5/2000 | See et al. |
| 6,073,075 | A | 6/2000 | Kondou et al. |
| 6,073,152 | A | 6/2000 | De Vries |
| 6,078,568 | A | 6/2000 | Wright et al. |
| 6,088,591 | A | 7/2000 | Trompower et al. |
| 6,101,539 | A | 8/2000 | Kennelly et al. |
| 6,115,390 | A | 9/2000 | Chuah |
| 6,118,771 | A | 9/2000 | Tajika et al. |
| 6,119,009 | A | 9/2000 | Baranger et al. |
| 6,122,520 | A | 9/2000 | Want et al. |
| 6,144,638 | A | 11/2000 | Obenhuber et al. |
| 6,148,199 | A | 11/2000 | Hoffman et al. |
| 6,154,776 | A | 11/2000 | Martin |
| 6,160,804 | A | 12/2000 | Ahmed et al. |
| 6,177,905 | B1 | 1/2001 | Welch |
| 6,188,649 | B1 | 2/2001 | Birukawa et al. |
| 6,199,032 | B1 | 3/2001 | Anderson |
| 6,208,629 | B1 | 3/2001 | Jaszewski et al. |
| 6,208,841 | B1 | 3/2001 | Wallace et al. |
| 6,212,395 | B1 | 4/2001 | Lu et al. |
| 6,218,930 | B1 | 4/2001 | Katzenberg et al. |
| 6,240,078 | B1 | 5/2001 | Kuhnel et al. |
| 6,240,083 | B1 | 5/2001 | Wright et al. |
| 6,240,291 | B1 | 5/2001 | Narasimhan et al. |
| 6,246,751 | B1 | 6/2001 | Bergl et al. |
| 6,249,252 | B1 | 6/2001 | Dupray |
| 6,256,300 | B1 | 7/2001 | Ahmed et al. |
| 6,256,334 | B1 | 7/2001 | Adachi |

(56) References Cited

U.S. PATENT DOCUMENTS

| | | |
|---|---|---|
| 6,259,405 B1 | 7/2001 | Stewart et al. |
| 6,262,988 B1 | 7/2001 | Vig |
| 6,269,246 B1 | 7/2001 | Rao et al. |
| 6,285,662 B1 | 9/2001 | Watanabe et al. |
| 6,304,596 B1 | 10/2001 | Yamano et al. |
| 6,304,906 B1 | 10/2001 | Bhatti et al. |
| 6,317,599 B1 | 11/2001 | Rappaport et al. |
| 6,326,918 B1 | 12/2001 | Stewart |
| 6,336,035 B1 | 1/2002 | Somoza et al. |
| 6,336,152 B1 | 1/2002 | Richman et al. |
| 6,347,091 B1 | 2/2002 | Wallentin et al. |
| 6,356,758 B1 | 3/2002 | Almeida et al. |
| 6,393,290 B1 | 5/2002 | Ufongene |
| 6,397,040 B1 | 5/2002 | Titmuss et al. |
| 6,404,772 B1 | 6/2002 | Beach et al. |
| 6,421,714 B1 | 7/2002 | Rai et al. |
| 6,429,879 B1 | 8/2002 | Sturgeon et al. |
| 6,446,206 B1 | 9/2002 | Feldbaum |
| 6,456,239 B1 | 9/2002 | Werb et al. |
| 6,470,025 B1 | 10/2002 | Wilson et al. |
| 6,473,449 B1 | 10/2002 | Cafarella et al. |
| 6,487,604 B1 | 11/2002 | Rochford et al. |
| 6,493,679 B1 | 12/2002 | Rappaport et al. |
| 6,496,290 B1 | 12/2002 | Lee |
| 6,512,916 B1 | 1/2003 | Forbes, Jr. |
| 6,526,275 B1 | 2/2003 | Calvert |
| 6,535,732 B1 | 3/2003 | McIntosh et al. |
| 6,564,380 B1 | 5/2003 | Murphy |
| 6,567,146 B2 | 5/2003 | Hirakata et al. |
| 6,567,416 B1 | 5/2003 | Chuah |
| 6,570,867 B1 | 5/2003 | Robinson et al. |
| 6,574,240 B1 | 6/2003 | Tzeng |
| 6,580,700 B1 | 6/2003 | Pinard et al. |
| 6,584,494 B1 | 6/2003 | Manabe et al. |
| 6,587,680 B1 | 7/2003 | Ala-Laurila et al. |
| 6,587,835 B1 | 7/2003 | Treyz et al. |
| 6,603,970 B1 | 8/2003 | Huelamo Platas et al. |
| 6,614,787 B1 | 9/2003 | Jain et al. |
| 6,615,276 B1 | 9/2003 | Mastrianni et al. |
| 6,624,762 B1 | 9/2003 | End, III |
| 6,625,454 B1 | 9/2003 | Rappaport et al. |
| 6,631,267 B1 | 10/2003 | Clarkson et al. |
| 6,650,912 B2 | 11/2003 | Chen et al. |
| 6,658,389 B1 | 12/2003 | Alpdemir |
| 6,659,947 B1 | 12/2003 | Carter et al. |
| 6,661,787 B1 | 12/2003 | O'Connell et al. |
| 6,674,403 B2 | 1/2004 | Gray et al. |
| 6,677,894 B2 | 1/2004 | Sheynblat et al. |
| 6,678,516 B2 | 1/2004 | Nordman et al. |
| 6,678,802 B2 | 1/2004 | Hickson |
| 6,687,498 B2 | 2/2004 | McKenna et al. |
| 6,697,415 B1 | 2/2004 | Mahany |
| 6,721,334 B1 | 4/2004 | Ketcham |
| 6,721,548 B1 | 4/2004 | Mohindra et al. |
| 6,725,260 B1 | 4/2004 | Philyaw |
| 6,738,629 B1 | 5/2004 | McCormick et al. |
| 6,747,961 B1 | 6/2004 | Ahmed et al. |
| 6,756,940 B2 | 6/2004 | Oh et al. |
| 6,760,324 B1 | 7/2004 | Scott et al. |
| 6,785,275 B1 | 8/2004 | Boivie et al. |
| 6,788,938 B1 | 9/2004 | Sugaya et al. |
| 6,798,788 B1 | 9/2004 | Viswanath et al. |
| 6,801,782 B2 | 10/2004 | McCrady et al. |
| 6,826,399 B1 | 11/2004 | Hoffman et al. |
| 6,839,338 B1 | 1/2005 | Amara et al. |
| 6,839,348 B2 | 1/2005 | Tang et al. |
| 6,839,388 B2 | 1/2005 | Vaidyanathan |
| 6,847,620 B1 | 1/2005 | Meier |
| 6,847,892 B2 | 1/2005 | Zhou et al. |
| 6,856,800 B1 | 2/2005 | Henry et al. |
| 6,865,609 B1 | 3/2005 | Gubbi et al. |
| 6,879,812 B2 | 4/2005 | Agrawal et al. |
| 6,901,439 B1 | 5/2005 | Bonasia et al. |
| 6,917,688 B2 | 7/2005 | Yu et al. |
| 6,934,260 B1 | 8/2005 | Kanuri |
| 6,937,566 B1 | 8/2005 | Forslow |
| 6,938,079 B1 | 8/2005 | Anderson et al. |
| 6,957,067 B1 | 10/2005 | Iyer et al. |
| 6,973,622 B1 | 12/2005 | Rappaport et al. |
| 6,978,301 B2 | 12/2005 | Tindal |
| 6,980,533 B1 | 12/2005 | Abraham et al. |
| 6,985,469 B1 | 1/2006 | Leung |
| 6,985,697 B2 | 1/2006 | Smith et al. |
| 6,990,348 B1 | 1/2006 | Benveniste |
| 6,993,683 B2 | 1/2006 | Bhat et al. |
| 6,996,630 B1 | 2/2006 | Masaki et al. |
| 7,013,157 B1 | 3/2006 | Norman et al. |
| 7,020,438 B2 | 3/2006 | Sinivaara et al. |
| 7,020,773 B1 | 3/2006 | Otway et al. |
| 7,024,199 B1 | 4/2006 | Massie et al. |
| 7,024,394 B1 | 4/2006 | Ashour et al. |
| 7,027,773 B1 | 4/2006 | McMillin |
| 7,028,312 B1 | 4/2006 | Merrick et al. |
| 7,031,705 B2 | 4/2006 | Grootwassink |
| 7,035,220 B1 | 4/2006 | Simcoe |
| 7,039,037 B2 | 5/2006 | Wang et al. |
| 7,058,414 B1 | 6/2006 | Rofheart et al. |
| 7,062,566 B2 | 6/2006 | Amara et al. |
| 7,068,999 B2 | 6/2006 | Ballai |
| 7,079,537 B1 | 7/2006 | Kanuri et al. |
| 7,089,322 B1 | 8/2006 | Stallmann |
| 7,092,529 B2 | 8/2006 | Yu et al. |
| 7,110,756 B2 | 9/2006 | Diener |
| 7,116,979 B2 | 10/2006 | Backes et al. |
| 7,126,913 B1 | 10/2006 | Patel et al. |
| 7,134,012 B2 | 11/2006 | Doyle et al. |
| 7,139,829 B2 | 11/2006 | Wenzel et al. |
| 7,142,867 B1 | 11/2006 | Gandhi et al. |
| 7,146,166 B2 | 12/2006 | Backes et al. |
| 7,155,236 B2 | 12/2006 | Chen et al. |
| 7,155,518 B2 | 12/2006 | Forslow |
| 7,158,777 B2 | 1/2007 | Lee et al. |
| 7,159,016 B2 | 1/2007 | Baker |
| 7,221,927 B2 | 5/2007 | Kolar et al. |
| 7,224,970 B2 | 5/2007 | Smith et al. |
| 7,239,862 B1 | 7/2007 | Clare et al. |
| 7,246,243 B2 | 7/2007 | Uchida |
| 7,263,366 B2 | 8/2007 | Miyashita |
| 7,274,730 B2 | 9/2007 | Nakabayashi |
| 7,280,495 B1 | 10/2007 | Zweig et al. |
| 7,290,051 B2 | 10/2007 | Dobric et al. |
| 7,293,136 B1 | 11/2007 | More et al. |
| 7,310,664 B1 | 12/2007 | Merchant et al. |
| 7,317,914 B2 | 1/2008 | Adya et al. |
| 7,320,070 B2 | 1/2008 | Baum |
| 7,324,468 B2 | 1/2008 | Fischer |
| 7,324,487 B2 | 1/2008 | Saito |
| 7,324,489 B1 | 1/2008 | Iyer et al. |
| 7,336,961 B1 | 2/2008 | Ngan |
| 7,349,412 B1* | 3/2008 | Jones et al. ................ 370/401 |
| 7,350,077 B2 | 3/2008 | Meier et al. |
| 7,359,676 B2 | 4/2008 | Hrastar |
| 7,370,362 B2 | 5/2008 | Olson et al. |
| 7,376,080 B1 | 5/2008 | Riddle et al. |
| 7,379,423 B1 | 5/2008 | Caves et al. |
| 7,382,756 B2 | 6/2008 | Barber et al. |
| 7,417,953 B2 | 8/2008 | Hicks et al. |
| 7,421,248 B1 | 9/2008 | Laux et al. |
| 7,421,487 B1 | 9/2008 | Peterson et al. |
| 7,440,416 B2 | 10/2008 | Mahany et al. |
| 7,443,823 B2 | 10/2008 | Hunkeler et al. |
| 7,447,502 B2 | 11/2008 | Buckley |
| 7,451,316 B2 | 11/2008 | Halasz et al. |
| 7,460,855 B2 | 12/2008 | Barkley et al. |
| 7,466,678 B2 | 12/2008 | Cromer et al. |
| 7,475,130 B2 | 1/2009 | Silverman |
| 7,477,894 B1 | 1/2009 | Sinha |
| 7,480,264 B1 | 1/2009 | Duo et al. |
| 7,483,390 B2 | 1/2009 | Rover et al. |
| 7,489,648 B2 | 2/2009 | Griswold |
| 7,493,407 B2 | 2/2009 | Leedom et al. |
| 7,505,434 B1 | 3/2009 | Backes |
| 7,509,096 B2 | 3/2009 | Palm et al. |
| 7,519,372 B2 | 4/2009 | MacDonald et al. |

(56) References Cited

U.S. PATENT DOCUMENTS

| | | |
|---|---|---|
| 7,526,542 B2 | 4/2009 | Booman et al. |
| 7,529,925 B2 | 5/2009 | Harkins |
| 7,551,574 B1 | 6/2009 | Peden, II et al. |
| 7,551,619 B2 | 6/2009 | Tiwari |
| 7,558,266 B2 | 7/2009 | Hu |
| 7,570,656 B2 | 8/2009 | Raphaeli et al. |
| 7,573,859 B2 | 8/2009 | Taylor |
| 7,577,453 B2 | 8/2009 | Matta |
| 7,592,906 B1 | 9/2009 | Hanna et al. |
| 7,603,119 B1 * | 10/2009 | Durig et al. ............... 455/432.3 |
| 7,603,710 B2 | 10/2009 | Harvey et al. |
| 7,607,136 B2 | 10/2009 | Kuno et al. |
| 7,636,363 B2 | 12/2009 | Chang et al. |
| 7,665,132 B2 | 2/2010 | Hisada et al. |
| 7,680,501 B2 | 3/2010 | Sillasto et al. |
| 7,693,526 B2 | 4/2010 | Qian et al. |
| 7,706,749 B2 | 4/2010 | Ritala |
| 7,715,432 B2 | 5/2010 | Bennett |
| 7,716,379 B2 | 5/2010 | Ruan et al. |
| 7,724,703 B2 | 5/2010 | Matta et al. |
| 7,724,704 B2 | 5/2010 | Simons et al. |
| 7,729,278 B2 | 6/2010 | Chari et al. |
| 7,733,868 B2 | 6/2010 | Van Zijst |
| 7,738,433 B2 | 6/2010 | Tao |
| 7,746,897 B2 | 6/2010 | Stephenson et al. |
| 7,788,475 B2 | 8/2010 | Zimmer et al. |
| 7,805,529 B2 | 9/2010 | Galluzzo et al. |
| 7,817,554 B2 | 10/2010 | Skog et al. |
| 7,844,298 B2 | 11/2010 | Riley |
| 7,856,659 B2 | 12/2010 | Keeler et al. |
| 7,865,713 B2 | 1/2011 | Chesnutt et al. |
| 7,873,061 B2 | 1/2011 | Gast et al. |
| 7,894,852 B2 | 2/2011 | Hansen |
| 7,912,982 B2 | 3/2011 | Murphy |
| 7,920,548 B2 | 4/2011 | Lor et al. |
| 7,929,922 B2 | 4/2011 | Kubo |
| 7,945,399 B2 | 5/2011 | Nosovitsky et al. |
| 7,986,940 B2 | 7/2011 | Lee et al. |
| 8,000,724 B1 | 8/2011 | Rayburn et al. |
| 8,014,404 B2 | 9/2011 | Eki et al. |
| 8,019,082 B1 * | 9/2011 | Wiedmann et al. ........... 709/220 |
| 8,019,352 B2 | 9/2011 | Rappaport et al. |
| 8,116,275 B2 | 2/2012 | Matta et al. |
| 8,140,845 B2 | 3/2012 | Buddhikot et al. |
| 8,150,357 B2 | 4/2012 | Aragon |
| 8,161,278 B2 | 4/2012 | Harkins |
| 8,190,750 B2 | 5/2012 | Balachandran et al. |
| 8,238,942 B2 | 8/2012 | Gast |
| 8,270,384 B2 | 9/2012 | Cheng et al. |
| 2001/0007567 A1 | 7/2001 | Ando et al. |
| 2001/0024953 A1 | 9/2001 | Balogh |
| 2002/0021701 A1 | 2/2002 | Lavian et al. |
| 2002/0040352 A1 | 4/2002 | McCormick |
| 2002/0052205 A1 | 5/2002 | Belostotsky et al. |
| 2002/0060995 A1 | 5/2002 | Cervello et al. |
| 2002/0062384 A1 | 5/2002 | Tso |
| 2002/0069278 A1 | 6/2002 | Forslow |
| 2002/0078361 A1 | 6/2002 | Giroux et al. |
| 2002/0080790 A1 | 6/2002 | Beshai |
| 2002/0082913 A1 | 6/2002 | Li |
| 2002/0087699 A1 | 7/2002 | Karagiannis et al. |
| 2002/0094824 A1 | 7/2002 | Kennedy et al. |
| 2002/0095486 A1 | 7/2002 | Bahl |
| 2002/0101868 A1 | 8/2002 | Clear et al. |
| 2002/0116655 A1 | 8/2002 | Lew et al. |
| 2002/0157020 A1 | 10/2002 | Royer |
| 2002/0174137 A1 | 11/2002 | Wolff et al. |
| 2002/0176437 A1 | 11/2002 | Busch et al. |
| 2002/0188756 A1 | 12/2002 | Weil et al. |
| 2002/0191572 A1 | 12/2002 | Weinstein et al. |
| 2002/0194251 A1 | 12/2002 | Richter et al. |
| 2003/0014646 A1 | 1/2003 | Buddhikot et al. |
| 2003/0018661 A1 | 1/2003 | Darugar |
| 2003/0018889 A1 * | 1/2003 | Burnett et al. ............... 713/153 |
| 2003/0043073 A1 | 3/2003 | Gray et al. |
| 2003/0055959 A1 | 3/2003 | Sato |
| 2003/0107590 A1 | 6/2003 | Levillain et al. |
| 2003/0120764 A1 | 6/2003 | Laye et al. |
| 2003/0133450 A1 | 7/2003 | Baum |
| 2003/0134642 A1 | 7/2003 | Kostic et al. |
| 2003/0135762 A1 | 7/2003 | Macaulay |
| 2003/0145081 A1 | 7/2003 | Lau et al. |
| 2003/0156586 A1 | 8/2003 | Lee et al. |
| 2003/0174706 A1 | 9/2003 | Shankar et al. |
| 2003/0193910 A1 | 10/2003 | Shoaib et al. |
| 2003/0204596 A1 | 10/2003 | Yadav |
| 2003/0227934 A1 | 12/2003 | White et al. |
| 2004/0002343 A1 | 1/2004 | Brauel et al. |
| 2004/0003285 A1 | 1/2004 | Whelan et al. |
| 2004/0008652 A1 | 1/2004 | Tanzella et al. |
| 2004/0019857 A1 | 1/2004 | Teig et al. |
| 2004/0025044 A1 | 2/2004 | Day |
| 2004/0029580 A1 | 2/2004 | Haverinen et al. |
| 2004/0030777 A1 | 2/2004 | Reedy et al. |
| 2004/0030931 A1 | 2/2004 | Chamandy et al. |
| 2004/0038687 A1 | 2/2004 | Nelson |
| 2004/0044749 A1 | 3/2004 | Harkin |
| 2004/0047320 A1 | 3/2004 | Eglin |
| 2004/0049699 A1 | 3/2004 | Griffith et al. |
| 2004/0053632 A1 | 3/2004 | Nikkelen et al. |
| 2004/0054569 A1 | 3/2004 | Pombo et al. |
| 2004/0054774 A1 | 3/2004 | Barber et al. |
| 2004/0054926 A1 | 3/2004 | Ocepek et al. |
| 2004/0062267 A1 | 4/2004 | Minami et al. |
| 2004/0064560 A1 | 4/2004 | Zhang et al. |
| 2004/0064591 A1 | 4/2004 | Noble |
| 2004/0068668 A1 | 4/2004 | Lor et al. |
| 2004/0078598 A1 | 4/2004 | Barber et al. |
| 2004/0093506 A1 | 5/2004 | Grawrock et al. |
| 2004/0095914 A1 | 5/2004 | Katsube et al. |
| 2004/0095932 A1 | 5/2004 | Astarabadi et al. |
| 2004/0106403 A1 | 6/2004 | Mori et al. |
| 2004/0111640 A1 | 6/2004 | Baum |
| 2004/0114546 A1 | 6/2004 | Seshadri et al. |
| 2004/0119641 A1 | 6/2004 | Rapeli |
| 2004/0120370 A1 | 6/2004 | Lupo |
| 2004/0132438 A1 | 7/2004 | White |
| 2004/0143428 A1 | 7/2004 | Rappaport et al. |
| 2004/0143755 A1 | 7/2004 | Whitaker et al. |
| 2004/0165545 A1 | 8/2004 | Cook |
| 2004/0174900 A1 | 9/2004 | Volpi et al. |
| 2004/0184475 A1 | 9/2004 | Meier |
| 2004/0193709 A1 | 9/2004 | Selvaggi et al. |
| 2004/0208570 A1 | 10/2004 | Reader |
| 2004/0214572 A1 | 10/2004 | Thompson et al. |
| 2004/0221042 A1 | 11/2004 | Meier |
| 2004/0230370 A1 | 11/2004 | Tzamaloukas |
| 2004/0233234 A1 | 11/2004 | Chaudhry et al. |
| 2004/0236702 A1 | 11/2004 | Fink et al. |
| 2004/0246937 A1 | 12/2004 | Duong et al. |
| 2004/0246962 A1 | 12/2004 | Kopeikin et al. |
| 2004/0252656 A1 | 12/2004 | Shiu et al. |
| 2004/0255167 A1 | 12/2004 | Knight |
| 2004/0259552 A1 | 12/2004 | Ihori et al. |
| 2004/0259555 A1 | 12/2004 | Rappaport et al. |
| 2004/0259575 A1 | 12/2004 | Perez-Breva et al. |
| 2005/0015592 A1 | 1/2005 | Lin |
| 2005/0021979 A1 | 1/2005 | Wiedmann et al. |
| 2005/0025103 A1 | 2/2005 | Ko et al. |
| 2005/0025105 A1 | 2/2005 | Rue |
| 2005/0026611 A1 | 2/2005 | Backes |
| 2005/0030894 A1 | 2/2005 | Stephens |
| 2005/0030929 A1 | 2/2005 | Swier et al. |
| 2005/0037733 A1 | 2/2005 | Coleman et al. |
| 2005/0037818 A1 | 2/2005 | Seshadri et al. |
| 2005/0040968 A1 | 2/2005 | Damarla et al. |
| 2005/0050540 A1 | 3/2005 | Shaughnessy et al. |
| 2005/0054326 A1 | 3/2005 | Rogers |
| 2005/0054350 A1 | 3/2005 | Zegelin |
| 2005/0058132 A1 | 3/2005 | Okano et al. |
| 2005/0059405 A1 | 3/2005 | Thomson et al. |
| 2005/0059406 A1 | 3/2005 | Thomson et al. |
| 2005/0064873 A1 | 3/2005 | Karaoguz et al. |
| 2005/0068925 A1 | 3/2005 | Palm et al. |

(56) References Cited

U.S. PATENT DOCUMENTS

| | | |
|---|---|---|
| 2005/0073980 A1 | 4/2005 | Thomson et al. |
| 2005/0078644 A1 | 4/2005 | Tsai et al. |
| 2005/0097618 A1 | 5/2005 | Arling et al. |
| 2005/0114649 A1 | 5/2005 | Challener et al. |
| 2005/0120125 A1 | 6/2005 | Morten et al. |
| 2005/0122927 A1 | 6/2005 | Wentink |
| 2005/0122977 A1 | 6/2005 | Lieberman |
| 2005/0128142 A1 | 6/2005 | Shin et al. |
| 2005/0128989 A1 | 6/2005 | Bhagwat et al. |
| 2005/0144237 A1 | 6/2005 | Heredia et al. |
| 2005/0147032 A1 | 7/2005 | Lyon et al. |
| 2005/0157730 A1 | 7/2005 | Grant et al. |
| 2005/0159154 A1 | 7/2005 | Goren |
| 2005/0163078 A1 | 7/2005 | Oba et al. |
| 2005/0163146 A1 | 7/2005 | Ota et al. |
| 2005/0166072 A1 | 7/2005 | Converse et al. |
| 2005/0175027 A1 | 8/2005 | Miller et al. |
| 2005/0180345 A1 | 8/2005 | Meier |
| 2005/0180358 A1 | 8/2005 | Kolar et al. |
| 2005/0181805 A1 | 8/2005 | Gallagher |
| 2005/0193103 A1 | 9/2005 | Drabik |
| 2005/0207336 A1 | 9/2005 | Choi et al. |
| 2005/0213519 A1 | 9/2005 | Relan et al. |
| 2005/0220033 A1 | 10/2005 | DelRegno et al. |
| 2005/0223111 A1 | 10/2005 | Bhandaru et al. |
| 2005/0239461 A1 | 10/2005 | Verma et al. |
| 2005/0240665 A1 | 10/2005 | Gu et al. |
| 2005/0243737 A1 | 11/2005 | Dooley et al. |
| 2005/0245258 A1 | 11/2005 | Classon et al. |
| 2005/0245269 A1 | 11/2005 | Demirhan et al. |
| 2005/0256931 A1 | 11/2005 | Follmeg et al. |
| 2005/0259597 A1 | 11/2005 | Benedetto et al. |
| 2005/0259611 A1 | 11/2005 | Bhagwat et al. |
| 2005/0268335 A1 | 12/2005 | Le et al. |
| 2005/0270992 A1 | 12/2005 | Sanzgiri et al. |
| 2005/0273442 A1 | 12/2005 | Bennett et al. |
| 2005/0276218 A1 | 12/2005 | Ooghe et al. |
| 2005/0278614 A1 | 12/2005 | Aizikowitz et al. |
| 2005/0286466 A1 | 12/2005 | Tagg et al. |
| 2006/0030290 A1 | 2/2006 | Rudolf et al. |
| 2006/0035662 A1 | 2/2006 | Jeong et al. |
| 2006/0039395 A1 | 2/2006 | Perez-Costa et al. |
| 2006/0041683 A1 | 2/2006 | Subramanian et al. |
| 2006/0045050 A1 | 3/2006 | Floros et al. |
| 2006/0046744 A1 | 3/2006 | Dublish et al. |
| 2006/0050742 A1 | 3/2006 | Grandhi et al. |
| 2006/0064480 A1 | 3/2006 | Lesartre et al. |
| 2006/0073847 A1 | 4/2006 | Pirzada et al. |
| 2006/0088050 A1 | 4/2006 | Kumar et al. |
| 2006/0094440 A1 | 5/2006 | Meier et al. |
| 2006/0098607 A1 | 5/2006 | Zeng et al. |
| 2006/0104224 A1 | 5/2006 | Singh et al. |
| 2006/0114872 A1 | 6/2006 | Hamada |
| 2006/0114938 A1 | 6/2006 | Kalkunte et al. |
| 2006/0117174 A1 | 6/2006 | Lee |
| 2006/0128415 A1 | 6/2006 | Horikoshi et al. |
| 2006/0143496 A1 | 6/2006 | Silverman |
| 2006/0143702 A1 | 6/2006 | Hisada et al. |
| 2006/0152344 A1 | 7/2006 | Mowery |
| 2006/0160540 A1 | 7/2006 | Strutt et al. |
| 2006/0161983 A1 | 7/2006 | Cothrell et al. |
| 2006/0165103 A1 | 7/2006 | Trudeau et al. |
| 2006/0168383 A1 | 7/2006 | Lin |
| 2006/0173844 A1* | 8/2006 | Zhang et al. ............. 707/9 |
| 2006/0174336 A1 | 8/2006 | Chen |
| 2006/0178168 A1 | 8/2006 | Roach |
| 2006/0182118 A1 | 8/2006 | Lam et al. |
| 2006/0187878 A1 | 8/2006 | Calhoun et al. |
| 2006/0189311 A1 | 8/2006 | Cromer et al. |
| 2006/0190721 A1 | 8/2006 | Kawakami et al. |
| 2006/0193258 A1 | 8/2006 | Ballai |
| 2006/0200862 A1 | 9/2006 | Olson et al. |
| 2006/0206582 A1 | 9/2006 | Finn |
| 2006/0215601 A1 | 9/2006 | Vleugels et al. |
| 2006/0217131 A1 | 9/2006 | Alizadeh-Shabdiz et al. |
| 2006/0245393 A1 | 11/2006 | Bajic |
| 2006/0248229 A1 | 11/2006 | Saunderson et al. |
| 2006/0248331 A1 | 11/2006 | Harkins |
| 2006/0265689 A1 | 11/2006 | Kuznetsov et al. |
| 2006/0268696 A1* | 11/2006 | Konstantinov et al. ....... 370/229 |
| 2006/0274774 A1 | 12/2006 | Srinivasan et al. |
| 2006/0276192 A1 | 12/2006 | Dutta et al. |
| 2006/0285489 A1 | 12/2006 | Francisco et al. |
| 2006/0292992 A1 | 12/2006 | Tajima et al. |
| 2007/0002833 A1 | 1/2007 | Bajic |
| 2007/0008884 A1 | 1/2007 | Tang |
| 2007/0010248 A1* | 1/2007 | Dravida et al. ............ 455/435.1 |
| 2007/0011318 A1 | 1/2007 | Roth |
| 2007/0025265 A1 | 2/2007 | Porras et al. |
| 2007/0025306 A1* | 2/2007 | Cox et al. ...................... 370/338 |
| 2007/0027964 A1 | 2/2007 | Herrod et al. |
| 2007/0054616 A1 | 3/2007 | Culbert |
| 2007/0058598 A1 | 3/2007 | Ling |
| 2007/0064673 A1 | 3/2007 | Bhandaru et al. |
| 2007/0064718 A1 | 3/2007 | Ekl et al. |
| 2007/0067823 A1 | 3/2007 | Shim et al. |
| 2007/0070937 A1 | 3/2007 | Demirhan et al. |
| 2007/0076694 A1 | 4/2007 | Iyer et al. |
| 2007/0081477 A1 | 4/2007 | Jakkahalli et al. |
| 2007/0082677 A1* | 4/2007 | Donald Hart et al. ..... 455/456.1 |
| 2007/0083924 A1 | 4/2007 | Lu |
| 2007/0086378 A1 | 4/2007 | Matta et al. |
| 2007/0086397 A1 | 4/2007 | Taylor |
| 2007/0086398 A1 | 4/2007 | Tiwari |
| 2007/0091845 A1 | 4/2007 | Brideglall |
| 2007/0091889 A1 | 4/2007 | Xiao et al. |
| 2007/0098086 A1 | 5/2007 | Bhaskaran |
| 2007/0104197 A1 | 5/2007 | King |
| 2007/0106776 A1 | 5/2007 | Konno et al. |
| 2007/0109991 A1 | 5/2007 | Bennett |
| 2007/0110035 A1 | 5/2007 | Bennett |
| 2007/0115842 A1 | 5/2007 | Matsuda et al. |
| 2007/0133494 A1 | 6/2007 | Lai et al. |
| 2007/0135159 A1 | 6/2007 | Sinivaara |
| 2007/0135866 A1 | 6/2007 | Baker et al. |
| 2007/0136372 A1 | 6/2007 | Proctor et al. |
| 2007/0140163 A1 | 6/2007 | Meier et al. |
| 2007/0143851 A1 | 6/2007 | Nicodemus et al. |
| 2007/0147318 A1 | 6/2007 | Ross et al. |
| 2007/0150945 A1 | 6/2007 | Whitaker et al. |
| 2007/0160046 A1 | 7/2007 | Matta |
| 2007/0171909 A1 | 7/2007 | Pignatelli |
| 2007/0183375 A1 | 8/2007 | Tiwari |
| 2007/0183402 A1 | 8/2007 | Bennett |
| 2007/0189222 A1 | 8/2007 | Kolar et al. |
| 2007/0195793 A1 | 8/2007 | Grosser et al. |
| 2007/0230457 A1 | 10/2007 | Kodera et al. |
| 2007/0248009 A1 | 10/2007 | Petersen |
| 2007/0253380 A1 | 11/2007 | Jollota et al. |
| 2007/0255116 A1 | 11/2007 | Mehta et al. |
| 2007/0258448 A1 | 11/2007 | Hu |
| 2007/0260720 A1 | 11/2007 | Morain |
| 2007/0268506 A1 | 11/2007 | Zeldin |
| 2007/0268514 A1 | 11/2007 | Zeldin et al. |
| 2007/0268515 A1 | 11/2007 | Freund et al. |
| 2007/0268516 A1 | 11/2007 | Bugwadia et al. |
| 2007/0286208 A1 | 12/2007 | Kanada et al. |
| 2007/0287390 A1 | 12/2007 | Murphy et al. |
| 2007/0291689 A1 | 12/2007 | Kapur et al. |
| 2007/0297329 A1 | 12/2007 | Park et al. |
| 2008/0002588 A1 | 1/2008 | McCaughan et al. |
| 2008/0008117 A1 | 1/2008 | Alizadeh-Shabdiz |
| 2008/0013481 A1 | 1/2008 | Simons et al. |
| 2008/0014916 A1 | 1/2008 | Chen |
| 2008/0031257 A1 | 2/2008 | He |
| 2008/0039114 A1 | 2/2008 | Phatak et al. |
| 2008/0049615 A1 | 2/2008 | Bugenhagen |
| 2008/0052393 A1 | 2/2008 | McNaughton et al. |
| 2008/0056200 A1 | 3/2008 | Johnson |
| 2008/0056211 A1 | 3/2008 | Kim et al. |
| 2008/0064356 A1 | 3/2008 | Khayrallah |
| 2008/0069018 A1 | 3/2008 | Gast |
| 2008/0080441 A1 | 4/2008 | Park et al. |
| 2008/0102815 A1 | 5/2008 | Sengupta et al. |

(56) References Cited

U.S. PATENT DOCUMENTS

| | | | |
|---|---|---|---|
| 2008/0107077 A1 | 5/2008 | Murphy |
| 2008/0114784 A1 | 5/2008 | Murphy |
| 2008/0117822 A1 | 5/2008 | Murphy et al. |
| 2008/0130523 A1 | 6/2008 | Fridman et al. |
| 2008/0151844 A1 | 6/2008 | Tiwari |
| 2008/0159319 A1 | 7/2008 | Gast et al. |
| 2008/0162921 A1 | 7/2008 | Chesnutt et al. |
| 2008/0215613 A1 | 9/2008 | Grasso |
| 2008/0220772 A1 | 9/2008 | Islam et al. |
| 2008/0226075 A1 | 9/2008 | Gast |
| 2008/0228942 A1 | 9/2008 | Lor et al. |
| 2008/0250496 A1 | 10/2008 | Namihira |
| 2008/0261615 A1 | 10/2008 | Kalhan |
| 2008/0276303 A1 | 11/2008 | Gast |
| 2009/0010206 A1 | 1/2009 | Giaretta et al. |
| 2009/0028118 A1 | 1/2009 | Gray et al. |
| 2009/0031044 A1 | 1/2009 | Barrack et al. |
| 2009/0046688 A1 | 2/2009 | Volpi et al. |
| 2009/0059930 A1 | 3/2009 | Ryan et al. |
| 2009/0067436 A1 | 3/2009 | Gast |
| 2009/0073905 A1 | 3/2009 | Gast |
| 2009/0131082 A1 | 5/2009 | Gast |
| 2009/0198999 A1 | 8/2009 | Harkins |
| 2009/0247103 A1 | 10/2009 | Aragon |
| 2009/0252120 A1 | 10/2009 | Kim et al. |
| 2009/0257437 A1 | 10/2009 | Tiwari |
| 2009/0260083 A1 | 10/2009 | Szeto et al. |
| 2009/0274060 A1 | 11/2009 | Taylor |
| 2009/0287816 A1 | 11/2009 | Matta et al. |
| 2009/0293106 A1 | 11/2009 | Gray et al. |
| 2010/0024007 A1 | 1/2010 | Gast |
| 2010/0040059 A1 | 2/2010 | Albert Hu |
| 2010/0067379 A1 | 3/2010 | Zhao et al. |
| 2010/0142478 A1 | 6/2010 | Forssell et al. |
| 2010/0159827 A1 | 6/2010 | Rhodes et al. |
| 2010/0180016 A1 | 7/2010 | Bugwadia et al. |
| 2010/0261475 A1 | 10/2010 | Kim et al. |
| 2010/0271188 A1 | 10/2010 | Nysen |
| 2010/0329177 A1 | 12/2010 | Murphy et al. |
| 2011/0128858 A1 | 6/2011 | Matta et al. |
| 2011/0158122 A1 | 6/2011 | Murphy et al. |
| 2011/0255466 A1 | 10/2011 | Gast et al. |
| 2012/0190320 A1 | 7/2012 | Aragon |
| 2012/0190323 A1 | 7/2012 | Aragon |
| 2012/0204031 A1 | 8/2012 | Harkins |

FOREIGN PATENT DOCUMENTS

| | | |
|---|---|---|
| EP | 1 542 409 A | 6/2005 |
| GB | 2 329 801 A | 3/1999 |
| GB | 2429080 A | 2/2007 |
| JP | 2000-215169 A1 | 8/2000 |
| JP | 2003-234751 A1 | 8/2003 |
| JP | 2003274454 | 9/2003 |
| JP | 2004-032525 A1 | 1/2004 |
| WO | WO-9403986 | 2/1994 |
| WO | WO-9911003 | 3/1999 |
| WO | WO 00/06271 A1 | 2/2000 |
| WO | WO 00/18148 | 3/2000 |
| WO | WO 00/54149 | 9/2000 |
| WO | WO 02/089442 A1 | 11/2002 |
| WO | WO-03085544 | 10/2003 |
| WO | WO 2004/013986 A1 | 2/2004 |
| WO | WO-2004095192 | 11/2004 |
| WO | WO-2004095800 | 11/2004 |
| WO | WO 2006/014512 A2 | 2/2006 |
| WO | WO 2007/136836 | 11/2007 |
| WO | WO 2010/130133 A1 | 11/2010 |

OTHER PUBLICATIONS

International Search Report PCT/US2007/012194 dated Feb. 4, 2008.
International Search Report PCT/US2007/012016 dated Jan. 4, 2008.
Written Opinion PCT/US2007/012016 dated Jan. 4, 2008.
Written Opinion PCT/US2007/012194 dated Feb. 4, 2008.
Written Opinion PCT/US2007/012195 dated Mar. 19, 2008.
Co-pending U.S. Appl. No. 11/588,849, filed Oct. 26, 2006.
Co-pending U.S. Appl. No. 11/588,878, filed Oct. 26, 2006.
Co-pending U.S. Appl. No. 11/588,848, filed Oct. 26, 2006.
Co-pending U.S. Appl. No. 11/437,537, filed May 19, 2006.
Co-pending U.S. Appl. No. 11/437,538, filed May 19, 2006.
Co-pending U.S. Appl. No. 11/437,387, filed May 19, 2006.
Co-pending U.S. Appl. No. 11/437,582, filed May 19, 2006.
Non-Final Office Action Mailed Jan. 22, 2010 in Co-pending U.S. Appl. No. 11/588,849, filed Oct. 26, 2006.
Non-Final Office Action Mailed May 13, 2010 in Co-pending U.S. Appl. No. 11/588,878, filed Oct. 26, 2006.
Non-Final Office Action Mailed Apr. 29, 2010 in Co-pending U.S. Appl. No. 11/588,848, filed Oct. 26, 2006.
Final Office Action Mailed Jul. 16, 2009 in Co-pending U.S. Appl. No. 11/437,537, filed May 19, 2006.
Non-Final Office Action Mailed Dec. 23, 2008 in Co-pending U.S. Appl. No. 11/437,537, filed May 19, 2006.
Final Office Action Mailed Jun. 10, 2009 in Co-pending U.S. Appl. No. 11/437,538, filed May 19, 2006.
Non-Final Office Action Mailed Dec. 22, 2008 in Co-pending U.S. Appl. No. 11/437,538, filed May 19, 2006.
Final Office Action Mailed Jul. 15, 2009 in Co-pending U.S. Appl. No. 11/437,387, filed May 19, 2006.
Non-Final Office Action Mailed Dec. 23, 2008 in Co-pending U.S. Appl. No. 11/437,387, filed May 19, 2006.
Final Office Action Mailed Jul. 22, 2009 in Co-pending U.S. Appl. No. 11/437,582, filed May 19, 2006.
Non-Final Office Action Mailed Jan. 8, 2009 in Co-pending U.S. Appl. No. 11/437,582, filed May 19, 2006.
Acampora and Winters, IEEE Communications Magazine, 25(28):11-20 (1987).
Acampora and Winters, IEEE Journal on selected Areas in Communications. SAC-5:796-804 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Fortunee et al., IEEE Computational Science and Engineering, "Wise Design of Indoor Wireless Systems: Practical Computation and Optimization", p. 58-68 (1995).
Freret et al., Applications of Spread-Spectrum Radio to Wireless Terminal Communications, Conf. Record, Nat'l Telecom. Conf., Nov. 30-Dec. 4, 1980.
Geier, Jim, Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propagation Model for In-Building Personal Communications Systems", International Journal of Wireless Information Networks, vol. 1, No. 1, 1994.
Kim et al., "Radio Propagation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Useres", (1977).
LAN/MAN Standars Committee of the IEEE Computer Society, Part 11: Wireless LAN Medium Access Control (MAC) and Physical Layer (PHY) Specifications: Higher Speed Physical Layer Extension in the 2.4 GHz Band, IEEE Std. 802.11b (1999).
Okamoto and Xu, IEEE, Proceeding so of the 13th Annual Hawaii International Conference on System Sciences, pp. 54-63 (1997).
Panjwani et al., "Interactive Computation of Coverage Regions for Wireless Communication in Multifloored Indoor Environments", IEEE Journal on Selected Areas in Communications, vol. 14, No. 3, Apr. 1996.

(56) References Cited

OTHER PUBLICATIONS

Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Achievable Accuracy of Site-Specific Path-Loss Predictions in Residential Environments", IEEE Transactions on Vehicular Technology, vol. 48, No. 3, May 1999.
Puttini, R., Percher, J., Me, L., and De Sousa, R. 2004. A fully distributed IDS for Manet. In *Proceedings of the Ninth international Symposium on Computers and Communications 2004 vol. 2 (ISCC"04)—vol. 02* (Jun. 28-Jul. 1, 2004). ISCC. IEEE Computer Society, Washington, DC, 331-338.
Seidel et al., "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus" IEEE ICUPC '96 Proceedings (1996).
Ullmo et al., "Wireless Propagation in Buildings: A Statistic Scattering Approach", IEEE Transactions on Vehicular Technology, vol. 48, No. 3, May 1999.
P. Martinez, M. Brunner, J. Quittek, F. Straus, J. Schonwlder, S. Mertens, T. Klie "Using the Script MIB for Policy-based Configuration Management", Technical University Braunschweig, Braunschweig, Germany, 2002.
Law, A., "New Service Discovery Protocol," Internet Citation [Online] XP002292473 Retrieved from the Internet: <URL: http://sern.uccalgary.ca~lawa/SENG60921/arch/SDP.htm> [retrieved Aug. 12, 2004] (15 pages).
P. Bahl et al., RADAR: An In-Building RF-based User Location and Tracking System, Microsoft Research, Mar. 2000, 10 pages.
Latvala J. et al., Evaluation of RSSI-Based Human Tracking, Proceedings for the 2000 European Signal Processing Conference, Sep. 2000, 9 pages.
Bahl P. et al. "User Location and Tracking in an In-Building Radio Network," Microsoft Research, Feb. 1999, 13 pages.
P. Bahl et al., A Software System for Locating Mobile Users: Design, Evaluation, and Lessons, Microsoft Research, Feb. 1999, 13 pages.
Chen, Yen-Chen et al., "Enabling Location-Based Services on Wireless LANs", Networks, 2003. ICON2003. The 11th IEEE International Conference, Sep. 28-Oct. 1, 2003, pp. 567-572.
Erten, Y. Murat, "A Layered Security Architecture for Corporate 802.11 Wireless Networks", Wireless Telecommunications Symposium, May 14-15, 2004, pp. 123-128.
Kleine-Ostmann, T., et al., "A Data Fusion Architecture for Enhanced Position Estimation in Wireless Networks," IEEE Communications Letters, vol. 5(8), Aug. 2001, p. 343-345.
Pulson, Time Domain Corporation, Ultra wideband (UWB) Radios for Precision Location, Third IEEE Workshop on Wireless Local Area Networks, Sep. 27-28, 2001, 8 pages.
Barber, S., Monitoring 802.1 Networks, IEEE 802.11, Sydney, NSW, May 13-17, 2002.
Latvala, J. et al. "Patient Tracking in a Hospital Environment Using Extended Kalman-filtering," Proceedings of the 1999 Middle East Conference on Networking, Nov. 1999, 5 pages.
Myllymaki, P. et al., "A Probabilistic Approach to WLAN User Location Estimation," Third IEEE Workshop on Wireless Local Area Networks, Sep. 27-28, 2001, 12 pages.
Potter, B., and Fleck, B., 802.11 Security, O'Reilly Media Inc., Dec. 2002, 14 pages.
McCann, S., et al., "Emergency Services for 802," IEEE 802.11-07/0505r1, Mar. 2007, 27 pages.
Di Sorte, D., et al., "On the Performance of Service Publishing in IEEE 802.11 Multi-Access Environment," IEEE Communications Letters, vol. 11, No. 4, Apr. 2007, 3 pages.
Microsoft Computer Dictionary, Fifth Edition, Microsoft Corporation, 2002, 2 pages.
Thomson, Allan, Cisco Systems, AP Power Down Notification, Power Point slide show; IEEE standards committee meeting Jul. 15, 2008; doc.: IEEE 802.11-08/0759r0, 14 pages.
3COM, Wireless LAN Mobility System: Wireless LAN Switch and Controller Configuration Guide, 3COM, Revision A, Oct. 2004, 476 pages.
3COM, Wireless LAN Switch Manager (3WXM), 3COM, Revision C, Oct. 2004, 8 pages.
3COM, Wireless LAN Switch and Controller; Quick Start Guide, 3COM, Revision B, Nov. 2004, 10 pages.
3COM, Wireless LAN Mobility System; Wireless LAN Switch and Controller Installation and Basic Configuration Guide, Revision B, Apr. 2005, 496 pages.
Johnson, David B, et al., "DSR The Dynamic Source Routing Protocol for Multi-Hop Wireless Ad Hoc Networks," Computer Science Department, Carnegie Mellon University, Nov. 3, 2005 (http://monarch.cs.rice.edu/monarch-papers/dsr-chapter00.pdf).
Information Sciences Institute, RFC-791—Internet Protocol, DARPA, Sep. 1981.
Aerohive Blog, posted by Devin Akin, Cooperative Control: Part 3, [Online] Retrieved from the Internet: <URL: http://blog.aerohive.com/blog/?p=71> Mar. 1, 2010 (3 pages).
Wikipedia, Wireless LAN, 2 definitions for wireless LAN roaming, [Online] [retrieved Oct. 4, 2010] Retrieved from the Internet: <URL: http://en.wikipedia.org/wiki/Wireless_LAN> (1 page).
U.S. Appl. No. 12/957,997, filed Dec. 1, 2010.
U.S. Appl. No. 13/447,656, filed Apr. 16, 2012.
U.S. Appl. No. 12/603,391, filed Oct. 21, 2009.
U.S. Appl. No. 13/396,124, filed Feb. 14, 2012.
U.S. Appl. No. 13/437,669, filed Apr. 2, 2012.
U.S. Appl. No. 13/437,673, filed Apr. 2, 2012.
U.S. Appl. No. 12/763,057, filed Apr. 19, 2010.
U.S. Appl. No. 09/866,474, filed May 29, 2001.
U.S. Appl. No. 13/017,801, filed Jan. 31, 2011.
Office Action for U.S. Appl. No. 11/784,307, mailed Sep. 22, 2009.
Final Office Action for U.S. Appl. No. 11/784,307, mailed Jun. 14, 2010.
Non-Final Office Action for U.S. Appl. No. 11/377,859, mailed Jan. 8, 2008.
Final Office Action for U.S. Appl. No. 11/377,859, mailed Aug. 27, 2008.
Office Action for U.S. Appl. No. 12/401,073, mailed Aug. 23, 2010.
Final Office Action for U.S. Appl. No. 12/401,073, mailed Apr. 1, 2011.
Office Action for U.S. Appl. No. 12/401,073, mailed Sep. 20, 2011.
Office Action for U.S. Appl. No. 11/326,966, mailed Nov. 14, 2008.
Office Action for U.S. Appl. No. 12/500,392, mailed Jun. 20, 2011.
Office Action for U.S. Appl. No. 11/400,165, mailed Aug. 19, 2008.
Office Action for U.S. Appl. No. 12/489,295, mailed Apr. 27, 2011.
Final Office Action for U.S. Appl. No. 12/489,295, mailed Jan. 18, 2012.
Office Action for U.S. Appl. No. 11/330,877, mailed Sep. 11, 2008.
Final Office Action for U.S. Appl. No. 11/330,877, mailed Mar. 13, 2009.
Office Action for U.S. Appl. No. 11/330,877, mailed Aug. 6, 2009.
Final Office Action for U.S. Appl. No. 11/330,877, mailed Apr. 22, 2010.
Office Action for U.S. Appl. No. 11/330,877, mailed Jan. 13, 2011.
Final Office Action for U.S. Appl. No. 11/330,877, mailed May 27, 2011.
Office Action for U.S. Appl. No. 11/351,104, mailed Oct. 28, 2008.
Office Action for U.S. Appl. No. 11/351,104, mailed Dec. 2, 2009.
Final Office Action for U.S. Appl. No. 11/351,104, mailed Jun. 10, 2009.
Office Action for U.S. Appl. No. 11/351,104, mailed May 26, 2010.
Office Action for U.S. Appl. No. 11/351,104, mailed Nov. 29, 2010.
Office Action for U.S. Appl. No. 11/351,104, mailed Jul. 26, 2011.
Office Action for U.S. Appl. No. 11/351,104, mailed Feb. 15, 2012.
Office Action for U.S. Appl. No. 11/331,789, mailed Jun. 13, 2008.
Final Office Action for U.S. Appl. No. 11/331,789, mailed Oct. 23, 2008.
Office Action for U.S. Appl. No. 11/331,789, mailed Aug. 5, 2009.
Office Action for U.S. Appl. No. 12/785,362, mailed Apr. 22, 2011.

(56) References Cited

OTHER PUBLICATIONS

Office Action for U.S. Appl. No. 11/417,830, mailed Nov. 14, 2008.
Final Office Action for U.S. Appl. No. 11/417,830, mailed May 28, 2009.
Office Action for U.S. Appl. No. 11/417,993, mailed Oct. 29, 2008.
Office Action for U.S. Appl. No. 12/370,562, mailed Sep. 30, 2010.
Office Action for U.S. Appl. No. 12/370,562, mailed Apr. 6, 2011.
Office Action for U.S. Appl. No. 12/370,562, mailed Jan. 17, 2012.
Office Action for U.S. Appl. No. 11/592,891, mailed Jan. 15, 2009.
Final Office Action for U.S. Appl. No. 11/592,891, mailed Jul. 20, 2009.
Office Action for U.S. Appl. No. 11/595,119, mailed Jul. 21, 2009.
Final Office Action for U.S. Appl. No. 11/595,119, mailed Jan. 5, 2010.
Office Action for U.S. Appl. No. 11/595,119, mailed Aug. 19, 2010.
Final Office Action for U.S. Appl. No. 11/595,119, mailed Aug. 2, 2011.
Office Action for U.S. Appl. No. 11/604,075, mailed May 3, 2010.
Office Action for U.S. Appl. No. 11/845,029, mailed Jul. 9, 2009.
Final Office Action for U.S. Appl. No. 11/845,029, mailed Jan. 25, 2010.
Office Action for U.S. Appl. No. 11/845,029, mailed May 14, 2010.
Final Office Action for U.S. Appl. No. 11/845,029, mailed Dec. 9, 2010.
Office Action for U.S. Appl. No. 11/845,029, mailed Sep. 27, 2011.
Office Action for U.S. Appl. No. 11/437,538, mailed Dec. 22, 2008.
Final Office Action for U.S. Appl. No. 11/437,538, mailed Jun. 10, 2009.
Office Action for U.S. Appl. No. 11/801,964, mailed Sep. 17, 2010.
Final Office Action for U.S. Appl. No. 11/801,964, mailed May 11, 2011.
Office Action for U.S. Appl. No. 12/304,100, mailed Jun. 17, 2011.
Final Office Action for U.S. Appl. No. 12/304,100, mailed Feb. 2, 2012.
Office Action for U.S. Appl. No. 11/487,722, mailed Aug. 7, 2009.
Office Action for U.S. Appl. No. 11/643,329, mailed Jul. 9, 2010.
Office Action for U.S. Appl. No. 11/648,359, mailed Nov. 19, 2009.
Office Action for U.S. Appl. No. 11/944,346, mailed Nov. 23, 2010.
Office Action for U.S. Appl. No. 12/077,051, mailed Dec. 28, 2010.
Final Office Action for U.S. Appl. No. 12/077,051, mailed Oct. 25, 2011.
Office Action for U.S. Appl. No. 12/113,535, mailed Apr. 21, 2011.
Final Office Action for U.S. Appl. No. 12/113,535, mailed Jan. 3, 2012.
Office Action for U.S. Appl. No. 11/852,234, mailed Jun. 29, 2009.
Office Action for U.S. Appl. No. 11/852,234, mailed Jan. 21, 2010.
Office Action for U.S. Appl. No. 11/852,234, mailed Aug. 9, 2010.
Office Action for U.S. Appl. No. 11/852,234, mailed Apr. 27, 2011.
Final Office Action for U.S. Appl. No. 11/852,234, mailed Jan. 20, 2012.
Office Action for U.S. Appl. No. 11/970,484, mailed Nov. 24, 2010.
Final Office Action for U.S. Appl. No. 11/970,484, mailed Jul. 22, 2011.
Office Action for U.S. Appl. No. 12/172,195, mailed Jun. 1, 2010.
Office Action for U.S. Appl. No. 12/172,195, mailed Nov. 12, 2010.
Office Action for U.S. Appl. No. 12/336,492, mailed Sep. 15, 2011.
Office Action for U.S. Appl. No. 12/210,917, mailed Nov. 15, 2010.
Final Office Action for U.S. Appl. No. 12/210,917, mailed May 13, 2011.
Office Action for U.S. Appl. No. 12/210,917, mailed Dec. 5, 2011.
Office Action for U.S. Appl. No. 10/235,338, mailed Jan. 8, 2003.
Office Action for U.S. Appl. No. 11/094,987, mailed Dec. 27, 2007.
Final Office Action for U.S. Appl. No. 11/094,987, mailed May 23, 2008.
Office Action for U.S. Appl. No. 11/094,987, mailed Oct. 21, 2008.
Office Action for U.S. Appl. No. 12/474,020, mailed Jun. 3, 2010.
Final Office Action for U.S. Appl. No. 12/474,020, mailed Oct. 4, 2010.
Office Action for U.S. Appl. No. 09/866,474, mailed Nov. 30, 2004.
Final Office Action for U.S. Appl. No. 09/866,474, mailed Jun. 10, 2005.
Office Action for U.S. Appl. No. 10/667,027, mailed Jul. 29, 2005.
Final Office Action for U.S. Appl. No. 10/667,027, mailed Mar. 10, 2006.
Office Action for U.S. Appl. No. 10/667,027, mailed May 5, 2006.
Final Office Action for U.S. Appl. No. 10/667,027, mailed Feb. 26, 2007.
Office Action for U.S. Appl. No. 10/666,848, mailed Mar. 22, 2007.
Office Action for U.S. Appl. No. 10/667,136, mailed Jan. 25, 2006.
Office Action for U.S. Appl. No. 10/667,136, mailed Aug. 28, 2006.
Final Office Action for U.S. Appl. No. 10/667,136, mailed Mar. 9, 2007.
International Search Report and Written Opinion for PCT/US05/004702, mailed Aug. 10, 2006.
International Search Report and Written Opinion for PCT/US2006/009525, mailed Sep. 13, 2007.
International Search Report and Written Opinion for PCT/US06/40500, mailed Aug. 17, 2007.
International Search Report and Written Opinion for PCT/US06/40498, mailed Dec. 28, 2007.
International Search Report and Written Opinion for PCT/US06/40499, mailed Dec. 13, 2007.
International Search Report and Written Opinion for PCT/US2007/19696, mailed Feb. 29, 2008.
International Search Report and Written Opinion for PCT/US07/013758 mailed Apr. 3, 2008.
Second Office Action for Chinese Application No. 2007800229623.X , mailed Mar. 7, 2012.
First Office Action for Chinese Application No. 2007800229623.X , mailed Dec. 31, 2010.
Extended Supplementary European Search Report for Application No. 07796005.2, mailed Feb. 14, 2012.
International Search Report and Written Opinion for PCT/US07/013757, mailed Jan. 22, 2008.
International Search Report and Written Opinion for PCT/US07/14847, mailed Apr. 1, 2008.
International Search Report and Written Opinion for PCT/US07/089134, mailed Apr. 10, 2008.
International Search Report and Written Opinion for PCT/US2008/010708, mailed May 18, 2009.
Office Action for Canadian Application No. 2,638,754, mailed Oct. 3, 2011.
Supplementary Partial European Search Report for European Application No. 02770460, mailed Aug. 20, 2004.
Supplementary Partial European Search Report for European Application No. 02770460, mailed Dec. 15, 2004.
Examination Report for European Application No. 02770460, Mar. 18, 2005.
Summons for Oral Hearing Proceedings for European Application No. 02770460, Jan. 31, 2006.
International Search Report for PCT/US02/28090, mailed Aug. 13, 2003.
International Preliminary Examination Report for PCT/US02/28090, mailed Oct. 29, 2003.
Examination Report for European Application No. 06006504, mailed Oct. 10, 2006.
English Translation of Office Action for Japanese Application No. 2006-088348, mailed Jan. 4, 2011.
International Search Report and Written Opinion for PCT/USO4/30769, mailed Oct. 4, 2005.
International Search Report and Written Opinion for PCT/USO4/30683, mailed Feb. 10, 2006.
International Search Report and Written Opinion for PCT/USO4/30684, mailed Feb. 10, 2006.
Canadian Office Action dated Nov. 14, 2013 for Application No. 2,654,379.
L. Yang et al. "Architecture Taxonomy for Control and Provisioning of Wireless Access Points (CAPWAP)", CAPWAP Working Group, Internet Draft, Nov. 16, 2004, pp. 1-44.
European Search Report dated Nov. 22, 2013 for Application No. 07795182.0.

(56) References Cited

OTHER PUBLICATIONS

European Search Report dated Nov. 22, 2013 for Application No. 11150170.6 (7 pages).
Sangheon Pack et al. "Fast-handoff support in IEEE 802.11 wireless networks," IEEE Communications Surveys, IEEE, NY, NY, vol. 9, No. 1, First Quarter 2007 (pp. 2-12) ISSN: 1553-877X.
Office Action for U.S. Appl. No. 12/957,997, mailed Aug. 28, 2012.
Final Office Action for U.S. Appl. No. 11/351,104, mailed Aug. 14, 2012.
Non-Final Office Action for U.S. Appl. No. 11/351,104, mailed Dec. 17, 2012.
Office Action for U.S. Appl. No. 13/396,124, mailed May 7, 2012.
Final Office Action for U.S. Appl. No. 12/370,562, mailed Jul. 26, 2012.
Office Action for U.S. Appl. No. 13/437,669, mailed May 30, 2012.
Office Action for U.S. Appl. No. 13/437,673, mailed May 30, 2012.
Office Action for U.S. Appl. No. 12/304,100, mailed May 29, 2012.
Final Office Action for U.S. Appl. No. 12/304,100, mailed Dec. 11, 2012.
Office Action for U.S. Appl. No. 12/172,195, mailed Feb. 14, 2013.
Final Office Action for U.S. Appl. No. 12/336,492, mailed Jun. 15, 2012.
Office Action for U.S. Appl. No. 11/970,484, mailed Jun. 20, 2012.
Extended Search Report for European Application No. 11188566.1, mailed Jan. 30, 2012.
Third Office Action for Chinese Application No. 200780029623.X, mailed Sep. 29, 2012—translation Yes.
European Examination Report for Application No. 07796005.2, mailed Sep. 4, 2012.

\* cited by examiner

AUTOMATED NETWORK DEVICE CONFIGURATION AND NETWORK DEPLOYMENT

CROSS-REFERENCE TO RELATED APPLICATIONS

This application is a continuation-in-part of U.S. patent application Ser. No. 11/437,582, filed May 19, 2006, which is incorporated by reference. This application is related to co-pending U.S. patent application Ser. Nos. 11/437,537; 11/437,538; and 11/437,387, each of which was filed on May 19, 2006, and each of which is incorporated by reference.

BACKGROUND

Heretofore configuration of a network device or a multiplicity of network devices, such as a wired or wireless network switch and one or a constellation of access point devices and other devices and/or subsystems that may be directly or indirectly connected or coupled with the network switch, have presented economic and intellectual challenges to network administrators. These challenges may become particularly apparent when a network spans the world, particularly where headquarters staff, management systems, and network administrators responsible for initial network configuration, network configuration modification, and/or network expansion are located in a different time zone, speak a different language, or are separated from local network administrators by a wide area network (WAN), such as the Internet.

While configuring a network device is not an extraordinarily difficult task for a trained network administrator, it may require some understanding of network device characteristics, network configuration, and/or network software, and often an ability to diagnose and trouble-shoot non-functioning devices or the network, such e.g., when there are two network devices that for initially unknown reasons appear to have the same or conflicting IP addresses.

In some situations, it may be possible for a network administrator to consult with a somewhat technically untrained lay person, such as a worker on the floor of a factory or warehouse, an office administrator, or other non-technical person, to configure network devices by talking over the telephone perhaps with the help of a computer link, however doing so for more than a few devices or indeed for dozens or hundreds of devices would be so administratively time consuming and costly that it becomes impractical.

Another attempted solution has been to pre-configure network devices at a site where network administrators are resident before reshipping the network devices to a remote location where they will operate. This may sometimes be referred to a staging or partially staging the devices or network.

Another attempted solution has been to pre-configure the devices with required configuration information at a place of manufacture and ship directly to the remote site for installation. However, this requires expertise and higher cost associated with customization for each device, and does not solve the problem of further configuring additional devices in a device tree starting (or ending) from the configured device. Thus, this approach only partially satisfies the requirements for a static network configuration. In addition, it present a security problem since the configuration information including any security information required for access to the network would be exposed at the point of manufacture and susceptible to compromise.

These and other problems become particularly acute when the network device to be configured is a wireless network device and where non-secure communication of device configuration and/or protocols used by the device and network would expose the network to compromise and vulnerability to outside attack. For these and other reasons there remains a need for a device, network architecture, and methods for configuring one, a plurality of, or indeed hundreds of similar or different network devices that are simple, reliable, and secure.

DETAILED DESCRIPTION

Secure system, device, method and management side and device side procedures, as well as computer programs and computer program products that provides for the automated network configuration of network devices, are disclosed. Network devices may be of any type, such as wired or wireless network switches, network access points or mobility points, routers, and/or other network devices, subsystems, or the like that require or benefit from being automatically configured with a network device or subsystem configuration, but to avoid the repeated listing or enumeration of each possible network device of subsystem type throughout the description, embodiments of inventive aspects are primarily described relative to wireless network devices or switches. In one particular non-limiting embodiment the network device comprises an auto-configuring or self-configuring wireless network switch such as a wide area network (WAN) or local area network (LAN) switch.

Techniques described in this paper can give an ability to send a network device, such as a wireless network switch, to a local or remote site and permit a person without any particular skill or training to merely plug the device into a network connection, such as for example for an Ethernet cable to a plug-in connector (such as to an RJ-45 port connector) on the case or housing of the device, press a button while switching on or otherwise applying electrical power or initiating operation of the device, and as a result of these actions cause the device to send a message to a predetermined network server over the Ethernet network and in return receive a full and complete configuration information or data set (or a supplemental data set to augment what is present) to place the network device in operation on the network and not requiring any further interaction with the network or a network administrator. This methodology may be repeated for any number of such network devices and may even, for example, be repeated for hundreds of network devices and geographically diverse installation sites each being distant from the central or headquarters management side server. More than one server, though not required, may also optionally be incorporated into the system operation and/or configuration either for purposes of redundancy or capacity. Although a server is or may be described here as being the configuration server, it will be appreciated that the configuration information serving functionality may be provided by a dedicated configuration server or my a server that provides for various other content, data, and information serving functionality, as well as the configuration information serving.

Figure 1:
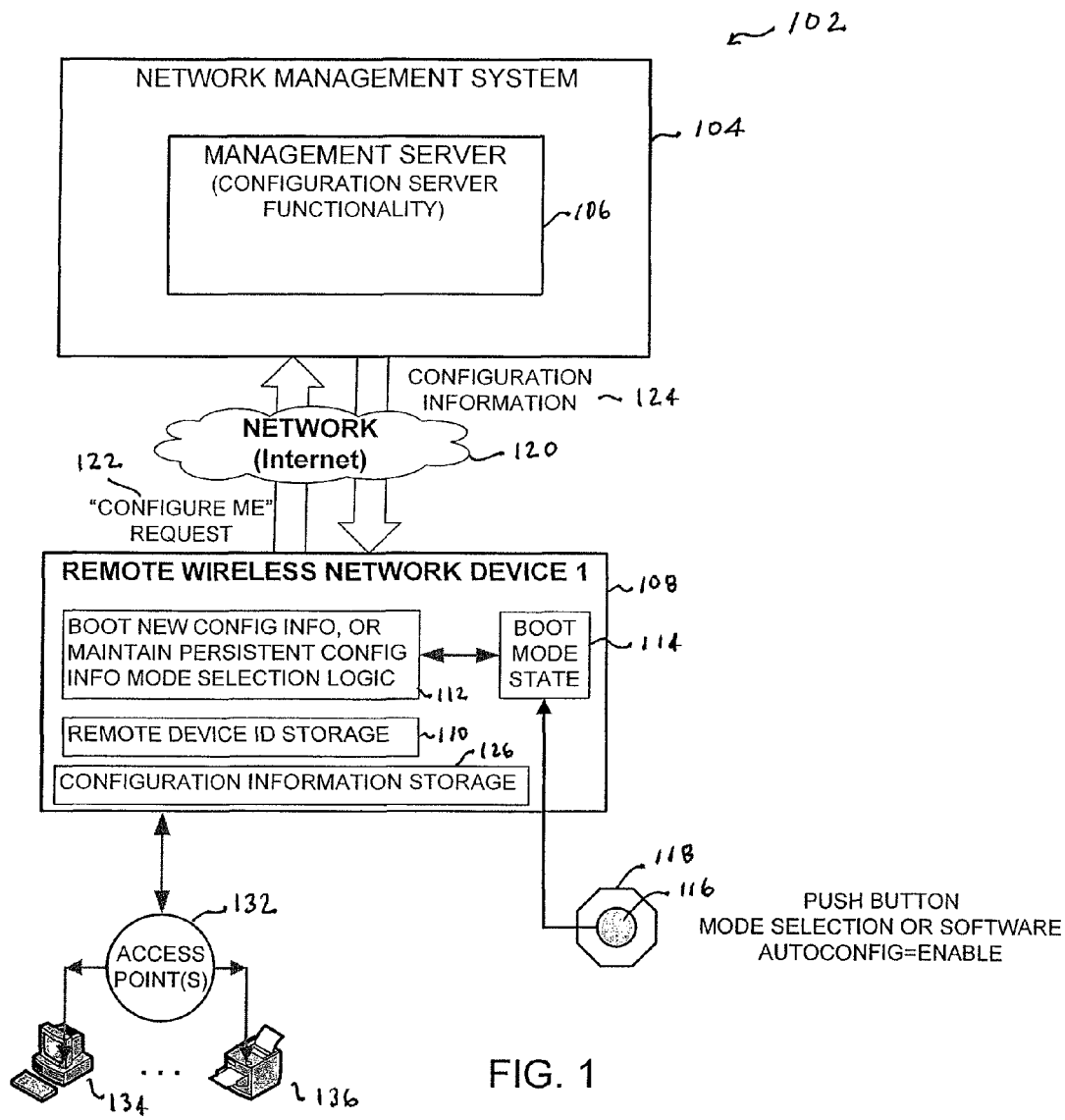
FIG. 1 depicts an example of a network device deployment system.

FIG. 1 is an example of a system showing elements of the headquarters or management side system including a management side server having network configuration functionality and an exemplary network device. While the network device may be any applicable type of network device or subsystem, here the network device is shown as remote wireless network switch on an 802.11 network.

With reference to FIG. 1, there is illustrated a functional block diagram showing a simplified embodiment of the system 102. In this configuration, a network management system 104, which includes a management server 106 having a device configuration server functionality, may be coupled for communication over a network, such as the Internet 120, to a network device 108, here shown as a first remote wireless network device 1. Systems, servers, and other devices can be referred to as engines. As used in this paper, an engine includes a processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware. Hardware computer-readable mediums may be referred to as "tangible computer-readable mediums." As used in this paper, "computer-readable storage mediums" are mediums capable of storing data in a non-ephemeral fashion, which includes both volatile and non-volatile storage.

It will be appreciated in light of the description provided herein that typically, a network will include a plurality of network devices 1, 2, . . . , N and that a single network device is shown here to simplify the description. It will also be appreciated that when there are a plurality of network devices, the network devices may be of different types or have different software versions or characteristics or functional requirements and may require different configuration information. In this embodiment the remote wireless network device 108 is a wireless network switch. Network switch 108 may as shown here be coupled to one or a plurality of access points 132 which may themselves couple to one or more devices 134, 136 such as for example notebook computers, personal data assistants (PDAs), printers, or any other network device. For example, the management server may be but is not limited to a Ringmaster® Server made by Trapeze Networks of Pleasanton, Calif.

Remote wireless network device 108 may include storage 110 for a remote device identifier, which storage may store one or more parameters that may uniquely, or even locally with the network, identify the physical or hardware device within the system 102. Remote wireless network device 108 also includes logic or processor 112 and program information for booting the network device 108 either with a new configuration information or when desired or required maintaining persistently the configuration that is already been stored in the network device 108. Typically the processor will include a coupled internal or external RAM memory. A configuration information persistent or non-volatile storage 126 is provided for storing configuration information. Persistent storage for program instructions and/or other parameters, including for example a network configuration information source identifier from which the network device will obtain its configuration. Clearly, if the network device has not previously stored network configuration information than it may be required that the network device 108 the loaded with new configuration information before the device is able to function properly on the network.

In an implementation, configuration information in the network device that was previously loaded is maintained when the network device 108 boots or is reset. Whenever a button 116 is pressed during boot or optional reset procedure, or when an optional autoconfiguration="enable" state is set by or in software and the state stored prior to booting, a sequence of events is initiated during which the network device requests from network management system 104 a configuration information ("configure me") request 122 and subsequently receives a configuration information item or information set requested 124 from the network management system 104. The boot or mode state 114 provides storage and an indicator so that at the time the network device boots a query may be made of this state so that the appropriate decision to request new configuration information or to maintain persistently the old configuration information may be known. The state may be stored in a memory or may be indicated directly by other physical property such as the state (for example, open or closed, or high or low impedance, high or low voltage, or the like) of a switch, line, or other physical element. The network device is programmed to take or execute different paths and execute different boot sequences depending upon the state of the boot mode state 114 stored. In at least one embodiment, the network device is capable of autonomous operation.

The invention is not limited to any particular configuration information item or set of configuration information. For example, it may be possible to request only a single configuration information item or a plurality of configuration information items. The configuration information can be referred to as a configuration data set, and this is understood to possibly be a single data item or a plurality of data items. Configuration information or data sets may be complete such as may be needed in an unconfigured network device or partial or supplemental such as may be need in an incompletely configured network device or where although complete, the configuration information in a network device needs to be changed or updated.

The request can include, by way of example but not limitation, a device Internet protocol (IP) address, a device class, a device site, a device location, a network mask (netmask), a network identifier, a device type to be configured, a software version identifier, a firmware version identifier, a data of manufacture, a DHCP source indicator, a pre-configuration fixed address indicator, a serial identifier (SID), and any combination of these. The software, firmware, or device hardware version tells what server what the device is capable of or can do, so that version based configuration information may be provided and is primarily (but not exclusively) of benefit for policy based configuration, as different versions may have different or advanced features not available or operable in other versions. When device identification based configuration is used, the device identifier such as the device serial number may provide unambiguous information as to any one or combination of hardware, software, and firmware characteristics of the network device.

In alternative implementations or configurations, different information or data can be provided in any particular configuration information or configuration data set that is requested by and subsequently sent to a network device.

The configuration information or data set should be sufficient to permit a client device or user to be able to connect with or otherwise access the network in the manner intended. Where for example, the access to the network is to be via a wireless connection and the network device is a wireless switch, the client device such as a notebook computer or other information appliance will access the network wirelessly via a wireless access point device, and the wireless access point device will be coupled with the network switch either via a wired or wireless connection or communications link. In this exemplary situation, configuration information concerning the access point radio-frequency or other radios (either via the so called networks supported by the access point in the context of Microsoft Windows operating system environments, or more generally in the context of SSIDs) should be provided as well as configuration information as to the identities of persons, users, user IDs, machine IDs, or other entities that should be allowed to or disallowed from connecting to the network via the network device (such as through the access point and switch).

The configuration information sent to a network switch can include configuration information for the access point or access points that communicate with the network through the switch. In another embodiment, the configuration information or data set defines how to configure these access point devices. In another embodiment, the configuration information or data set defines how to verify a user or client device. In still another embodiment, the configuration information or data set may define relationships of a one network device (e.g., a first switch) to another network device (e.g., a second switch) or to a plurality of switches to each other.

Relationships may for example, take into account mobility domains where a mobility domain is a collection of switches that know about each other and about each others sessions. Mobility domains may be provided for the purpose of permitting hand-offs during roaming or physical movement of the device or other devices coupled with the network device such as client machines possibly including computers, PDAs, and the like. Relationships are valuable so that they permit relationships and hand-offs if moving around from place to place. In this way the system and network can also provide virtual LANs with the user and client device staying on the same VLAN even though roaming through an area.

In one embodiment, where the network device comprises a switch, the access point and switch are configured to permit all client devices that can find the network or SSID to connect to it. Frequently, access points will broadcast their network identifier and/or SSID. Therefore in a situation where the owner, operator, or other network administrator entrusted with controlling access to the particular network had chosen to permit all users that wanted or requested access to the network, such as to a default LAN or virtual LAN (VLAN), to be able to access the network, then the configuration information may advantageously specify that any user of user's machine may connect to and have access over the network via that access point and switch.

More typically, the network administrator may choose to restrict access to the network. In this situation, the configuration information or data set sent to the device (the network switch and access points, in this example) will specify the identities of potential client devices that are permitted access.

In this situation, it may be desirable to provide configuration information about, by way of example but not limitation, what client devices or users of client devices can be validated to the network, what wireless protocols are enabled, any authentication information, a new fixed IP address if the IP address that had been used had been established by a DHCP or other entity, and/or any other information, parameters, or data that it is useful or advantageous for the network device or other devices coupled with it to have for purpose of the intended operation.

Essentially, sufficient configuration information needs to be present on the network device to permit getting clients (such as for example wireless clients) onto the network or SSID that they belong on (and not on other networks or SSIDs that they don't belong on) with the correct level of security (if any).

Access points (APs) broadcast the networks (in a Microsoft Windows based context) or SSID (in more general wireless networking context) that they support. In general, each access point radio can broadcast a single SSID or any number or plurality of SSIDs. The access points and/or clients connected to the SSIDs broadcast the SSID and broadcast the attributes of the network (such as dot1X, key authentication, and the like or other attributes). The attributes broadcast by the client device need to match or at least have common elements with the attributes of the switch to which the client devices connect to the network and may further need to be able to match these and/or other credentials to determine if the client device should be allowed on that network (SSID). The storage and/or matching of the parameters or attributes may be done on a server or locally. If the switch does not know about the user and/or the user's client device, then it cannot perform this look-up and matching, so that in embodiments where access is controlled in some way, the configuration information that is sent to the network device may include user or client access attributes or configuration information.

Configuration information may also specify relationships amongst network devices, such as switches, so that for example a roaming user or client device can maintain proper connection to the network even though the client device is moving from the radio range of one access point and/or switch to another one so that communication hand-off from one to the other may occur seamlessly, while at the same time not permitting hand-off or connection to a network that the user or client device is not entitled to connect to in spite of the device being in good radio frequency range of the access point or switch for that network or SSID.

It will be appreciated that in both of these exemplary situations, one involving unlimited access and one involving limited access, the configuration information or data set includes some client or other user identity information. However, in the event that the network device may be partially programmed or staged to specify either permitted or prohibited access, even this information or data need not be included within the configuration information that is sent to the requesting network device. It will be appreciated that the examples described herein provide structures and methods for a device to send a request for configuration information and to receive configuration information back from a different device or system, such as from a sever computer via a network, whatever that configuration information may be. It may also be desirable to confirm, update, check for updates, or validate all or only a portion of configuration information or data that was previously stored to the network device. The system is not necessarily limited to any particular configuration information or configuration data set, nor to the manner in which the configuration information was generated or stored.

It will be apparent that the configuration information request message may request any information and the server's response to the message may be full, partial, or a single configuration update to a stored configuration in the requesting network device. The configuration information sent may also be completely controlled by the centralized (or distributed) configuration distribution authority represented in the descriptions here as the management side configuration server.

Figure 2:
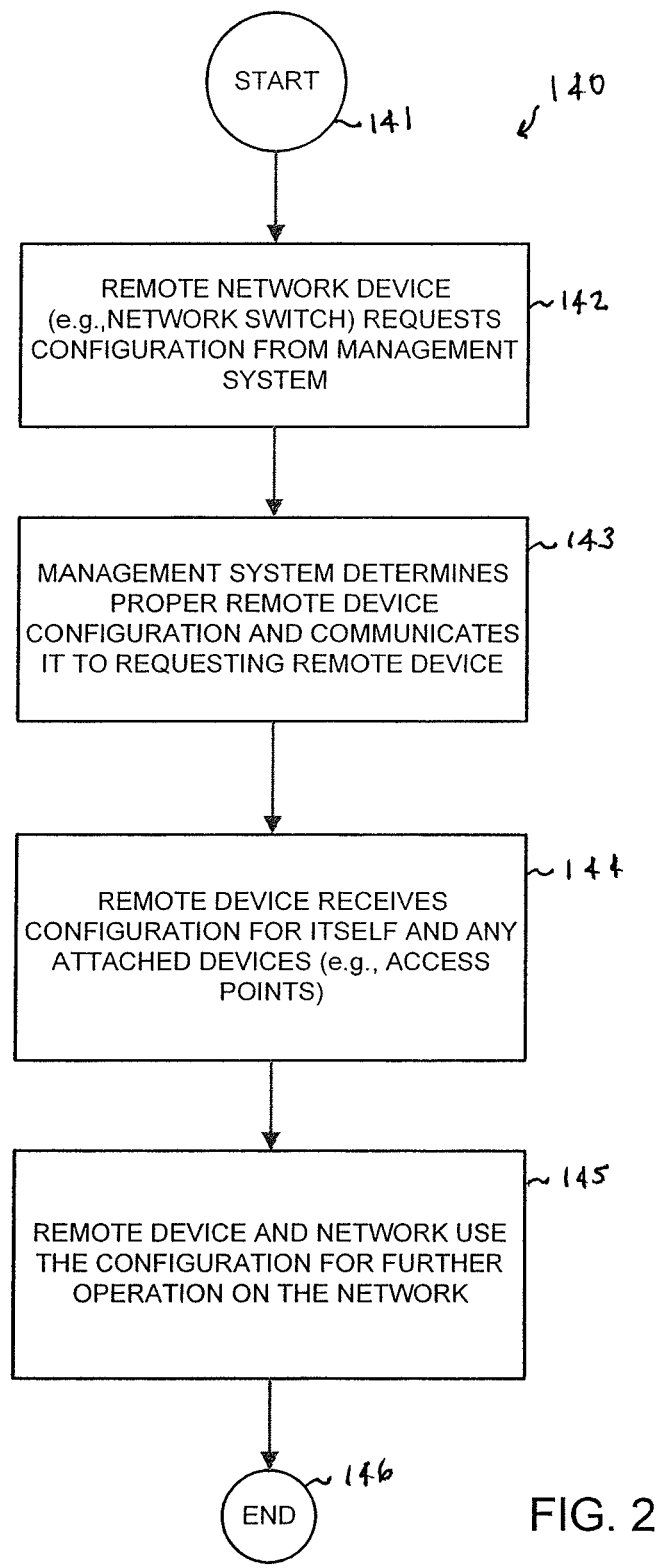
FIG. 2 depicts a flowchart of an example of requesting and receiving configuration information.

FIG. 2 depicts a flowchart of an example of a procedure for a network device requesting and receiving a configuration information or data set from a system management configuration server. The procedure begins at step 141 and thereafter the remote network device (for example a network switch) requests configuration information from the management system (step 142). Next, management system determines the proper or appropriate remote device configuration information and communicates its to the requesting remote device (step 143). The remote device then receives a configuration information for itself and may optionally but advantageously also receive configuration information for any attached devices, such as for example for one or more access points coupled with the remote network switch (step 145). Finally, the remote device and network use the configuration information sent or pushed down to the remote device for further operation on the network (step 145), upon which the procedure ends (step 146). Where network device information is sent to and/or used by the management side server, the network information may be either or a combination of a network device hardware information, a network device software information, a network device location information, a network device requester information, any other parameter that identifies a basis for establishing an operable configuration, and/or any combination of these.

It may be appreciated in light of the description provide here that the when the requesting network device sends its request message out, upon receipt the management system performs either a configuration data base look up or a configuration information generation based on one or more of the network device identification, network configuration policies, and/or on the basis of any combination of these with possible other factors. In doing the look-up or generation, the management side system may take into account the existing preconfigured policies, rules, preferences, existing configuration, legacy devices and/or any other parameters or characteristics that may or should impact the network device configuration, on the network that the management side or central administration has set up. It will create the right configuration that needs to be sent back to the network device. To the network device, it looks like it received its full configuration. For example, the full configuration for a network device that is or includes a network switch may include configuration information as to how to run its access points (APs) or mobility points (MPs), what SSIDs (service set identifiers) to provide, what Virtual Local Area Networks (VLANs) to configure, who to allow access to and what that access should be, and any other information that provides the desired operation of the configured device. These are merely non-limiting examples of the type of configuration information that a network device such as a switch might receive.

The description provided relative to an exemplary system configuration in FIG. 1, and an overview of the methodology presented in FIG. 2, provide an overview of examples of techniques described in this paper. Additional description is provided hereinafter that describes alternative configurations for both the management system 104 the network device, such as a remote wireless network device 108, as well as various embodiments of the overall method for communicating between the management system and the remote network devices including procedures executing within the management system alone, procedures executed within a remote wireless network device alone, and additional procedures that include components executed by a combination of the management system 104 and one or more of a plurality of remote wireless network devices 108.

Figure 3:
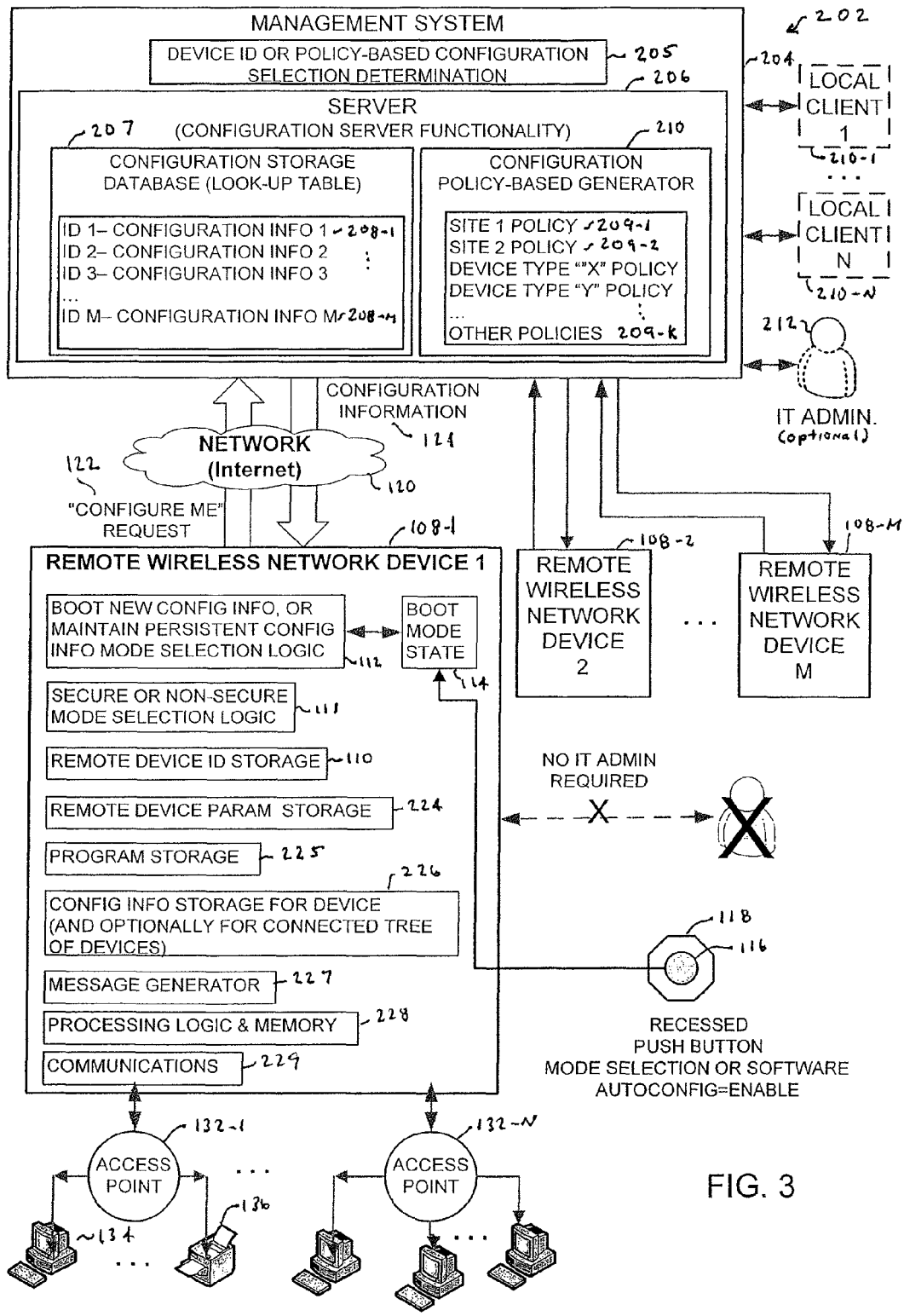
FIG. 3 depicts another example of a network device deployment system.

With reference to FIG. 3, there is illustrated and additional embodiment of the inventive system showing both management systems side structure 104, and intermediate network such as the Internet 120, and a plurality of network devices 108-$n$ where the or each of the plurality of network devices 108-$m$ is a remote wireless network device. Advantageously, the wireless devices may conform to one of the WI-FI or 802.11 wireless protocols, though a limitation to only to this protocol or to extensions, enhancements, and improvements to this protocol is not necessarily required.

Various features are now described, including, but not limited to inventive aspects that are particularly useful when replacing a failed network device, application of the methods and structures of inventive aspects to the rollout or deployment and configuration of new sites having hundreds of network devices to be configured, inventive aspects pertaining to central control and/or policy-based control of network device configuration, inventive aspects pertaining to novel characteristics of the physical hardware switch itself, inventive aspects that are particularly advantageous when scaling the method to large numbers of devices, inventive aspects pertaining to mutual device security authentication and encryption, application of the method not only to configuration of the device but also to the tree or hierarchy of other devices coupled with the configured device, inventive aspects applicable to maintaining a persistent or sticky configuration, inventive aspects pertaining to flexibility in choosing and pushing either a hardware based configuration or a policy-based configuration to the device, and of course application of the automated set-up and configuration procedures to drop-shipped network devices. These aspects may be combined and used synergistically in various ways.

Attention is now directed to some exemplary applications of the inventive system, device, and method where techniques described in this paper have particular advantages.

One common situation in the networking space is to have a network device fail, such as a network switch. This failure can be particularly problematic at a remote site where no network administrator or IT professional is available. In an implementation, a device identifier (and/or network policies) used to determine the configuration information that is to be sent to or pushed to replacement device. Under this replacement scenario, it would be possible to have a network device vendor or manufacturer pull a box containing the replacement device off of their inventory shelf, and without opening the box or performing any configuration of the device, drop ship a replacement network device using for example an express delivery service, directly from the manufacturer or vendor to the replacement site. At the same time, the manufacturer or vendor may inform the buyer as to the device identifier so that an entry may be made into the configuration information database ready for configuration information retrieval when it receives a request. Anyone at the replacement site then opens the box, disconnects the Ethernet cable from the failed network device, reconnects the Ethernet cable into the receptacle on the replacement device, plugs in electrical power (if an on-off switch is provided on the device) and at the time the on-off switch is switched from an off state to an on state, holds down the boot mode button on the device so that the replacement network device sends a message to the management side server requesting configuration information.

It will also be appreciated that implementations may utilize a combination of network device identity and policies to determine one or any set of network device configuration information, and that as with either identity based configuration or policy based configuration, the use of a combination of identity and policy based configuration may be implemented by pre-computing and storing such configuration in a database, computing it in real-time or substantially real time or dynamically determining configuration information upon receipt of a request for such configuration information or data set, or by any combination of pre-stored and real-time or dynamically determined configuration. Dynamically determined information for one device may even be stored and used or partially reused for a similar configuration with any necessary changes being made to customize the configuration information to the new request or requester.

The replacement network device knows to send its message to a particular server at a particular IP address location because at least in one embodiment, it is programmed at the time of manufacture (or if staged in advance of shipment, when being staged) to connect to a particular notorious DNS Domain Name System (or Service or Server), an Internet service that translates domain names into IP addresses.

More particularly, finding and ultimately connecting to a source of configuration information, such as a configuration information server, may be implemented in a variety of ways. In one embodiment, a particular name is identified to the network device, and that name is looked up or queried in the context of the local network or other defined network.

For example, in one non-limiting embodiment, when the network device powers-up and begins to boot or on a reset boot or other initiation phase, and is activated in an autoconfiguration mode, if it does not have an IP address (or optionally, even if it does) it sends a DHCP request to a DHCP server to obtain a first or a new IP address (because it may not have an IP address when it wakes up for the first time), it will also be assigned or otherwise be identified with a default router, and it will be assigned or otherwise identified to a DNS server, and finally according to one embodiment it will receive a domain name from the DHCP server. Alternatively, some or all of these may be preconfigured into the network device, such as at the time of manufacture or during some pre-deployment staging phase. This alternative mode may be useful if there is a possibility where their will be no DHCP server available or accessible during the setup, deployment, or rollout.

Next, a domain name lookup is performed on the server that has been identified to the network device as the sever to query during the autoconfiguration using a well known or other identified or notorious name appended to or pre-pended to the domain name. In one implementation this well known name is "wlanconfigserver," but the choice of name itself is not important. Furthermore, one does not actually have to know the address; it is enough to use the domain name to find the appropriate server.

That domain name will have or identify a valid IP address that applies to the particular DNS domain. DNS is an acronym for Domain Name System (or Service or Server), which is an Internet service that translates domain names into IP addresses. Because the DNS system is actually a network onto itself, if one DNS server doesn't recognize or know a particular domain name, it asks another DNS server, and so on, until the correct IP address is found.

The requesting network device is instructed to use this name to find the server. Typically, the network administrator or information technology (IT) group will have added that name with an address into their local DNS database. In this way, only the name is needed and the name can identify the address that locates the server. This DNS mechanism may readily be set up form a central or headquarters site and then sent out to various proxy servers if they exist so that this process as well may readily be accomplished remotely from the location of the device installation or deployment.

The known or notorious name (or other identifier) is programmed or otherwise loaded or stored into the network device before deployment, and an address is obtained during deployment (during the autoconfiguration process) by looking up the address based on the name using a DNS lookup. The DNS lookup is performed by the DNS server that was identified or provided by the DHCP server, and the domain name is provided by the DHCP server.

When, a situation arises when the name is not available in the DNS server then at least this portion of the process would need to be preconfigured (such as prior to shipment or during a staging phase) so that the remaining configuration may be obtained from the server over the network. Note that in this example, all of the network devices may be preconfigured with the same name information so that batch preconfiguration using a relatively simple procedure, small data set, and low skill level personal may be utilize when desired.

In another embodiment, the manufacturer or vendor may advantageously open the network device shipping box and program the network device to send a message to an IP address or server identified by the entity purchasing the replacement network device. In yet another embodiment, where the entity needing to replace a failed network device, maintains an inventory of spares, the entity may program a replacement network device so that it knows what IP address to contact to reach the central or other management side server for each of the spares, the entity may then simply pull a spare out of their inventory and ship it in the same manner to the site where it is needed. As the programming may be done in advance of the need for the replacement, there is no urgency involved, and typically no reason for a network administrator or IT professional to become involved. Note that it is only the IP address of the server to contact that need be programmed or otherwise stored in the replacement network device, and that the other configuration information is still downloaded to the device when it is installed. Therefore the network administrator may for example, purchase ten switches to use as replacement spares, program each with the server IP address to use with the request, and put them back on the spares shelf until needed. No customization for their ultimate location is required as each will obtain full configuration information upon receiving a response to its request once installed.

Once the management side server receives the request message it optionally authenticates the requesting network device (such as an initial authentication using the network device unique hardware ID), and sends the configuration information to the requesting network device. Therefore, it will be appreciated that virtually no expertise is needed to configure the replacement network device.

Although it may be desirable to configure the device based on the device identifier, in some implementations it may not be advantageous to set-up or configure the device based for example on the device serial number, security identifier (SID), or other identifier associated with the physical hardware. Even though this may be possible to do so, it may not be as efficient as other methods for replicating the configuration of the previous failed device. This is a legitimate approach, as well as the approach that may be preferred in a number of network configuration situations.

However in other instances, when such failure occurs, it may be preferable that the replacement device be set up exactly the same (or substantially the same when some hardware, firmware, or software version variation requires or benefits from some incremental change to that set up) as a failed device it replaces. In one implementation, there may be a set of network configuration policies that are used in whole or part to set-up, configure, and operate network devices. These policies may also take into account a particular device identifier or may utilize device type or other characteristics. Therefore, according to one embodiment, rather than tying configuration of the replacement device to a physical identifier associated with the device, the configuration of a failed device replacement device may be tied to the physical place or location or alternatively to the policies applied to devices in that location or environment so that it has the proper operation and association with the environment and other devices in that physical place or environment. It will be appreciated, that characteristics of the device itself may also be taking into account by the policies that are applied to the configuration and operation of the device. [0063] One of the attributes of the network typically associated with a physical place are the subnet addresses and the Internet protocol addresses that are associated with the location and the subnet. Using this localized information, the replacement device may be configured based on the standard policies (or optionally on customized policies) applied to devices of the same or similar type in that location or environment. Different devices such as wireless network switches may receive different configuration information than wireless routers or access points, but it may be the policies that determine within a type or class of device what the configuration should be not the individual device identifier itself. Location may for example mean a particular company office location or building, a particular city or other political jurisdiction, a particular operation such as a research laboratory in a research and development complex versus a warehouse facility collocated in the same complex. Security features, possibly including network access lists, may also be a form of policy based configuration. Therefore the idea of place or location relative to policies may also be different functional activities at the same location.

The ability to configure a network device based either on its physical identity, or one the basis of network policies applied to devices at the location, or even a combination of device identity and policies, each give added benefits and alternative flexibility.

Embodiments of the network device, such as a wireless network switch may interoperates with the server, such as the RingMaster™-based server and network software made by Trapeze Networks of Pleasanton, Calif., or with other servers and/or software to configure the devices and bring up the configured network devices and the network system automatically.

In one implementation, system, device, and method are provided to permit automatic and touch-free or substantially touch-free configuration of a network device at a location to be configured to operate on the network without the on-site participation or involvement of a technician, information technologist (IT) administrator or other trained professional. Touch-free operation means that the installer of the network device only needs to connect the network device to a communication link, such as a wired or wireless Ethernet or other network that can reach a source of configuration. This information source may typically be a network server (such as the management side server already described) and the network will be or include the Internet connected to the network device using an Ethernet cable or wireless equivalent. Once the network device has been connected to a network that can reach or connect to the configuration information source and power is applied to the network device so that it boots its operating program for operation as its particular type of network device, such as a network switch, the network device is programmed to contact its configuration information source and get its configuration information and then self install on the network without any other assistance or intervention. In another embodiment, someone must press (and optionally hold) a button or switch or other electrical or mechanical means for altering a logic state so that the network device will be instructed to contact the source of configuration information rather than use the already stored configuration information (if any) within the network device memory or logic.

This aspect is particularly advantageous in situations where for example, a network device at a location remote from a headquarters facility where the IT administrator or other IT technicians are resident has failed and needs to be replaced, or where a large number of network devices need to be rolled out in a new facility and even where an IT administrator or technician may be sent and made available, the travel and on-site time involved and the resulting costs increase the time involved to complete network roll out. Given these two extreme situations, one situation involving a single failed network device that requires replacement and the other situation requiring installation and configuration of an entire network either at a site where one or more IT professionals are available or where none are available, it will become apparent in light of the description provided herein that the inventive system, device, and method may be applied to situations that are intermediate between these two exemplary situations.

As the structure of the inventive network device may be replicated to an unlimited number of devices (such as a few hundred or a few thousand at a time in practical terms), a management side network server may be configured to interoperate with any number of such devices for the purpose of configuring the device(s), and as the method, procedures, and communications involved in configuring a device may typically involve the management side network server and a single network device at a time, implementations are first described relative to a single network device. It will then be appreciated in light of the description provided herein that the system may be extended to include and interoperate with any plurality of devices, including for example systems having only a few devices, to network configurations that have tens, hundreds, or even thousands of devices. Furthermore, the network devices to be configured may be of different physical types, may require different network configurations, and may be at different physical locations, to name only a few of the possible variations.

Two primary strategies for configuring a network device are described herein. The first strategy involving configuration of the network device based on a physical characteristic of the device, such as for example, a device serial number, a device IP address, a secure ID, or any other identifier associated with the physical hardware of the network device. This configuration approach is referred to as identity-based configuration or IBC. The second strategy involves configuration of the network device based on an applicable network policy or policies, where for example, the policies may be specific to the location where the network device is being installed or replaced. The network policies may also take into account the network device type, and/or other physical or functional aspects of the network device. This second configuration based at least in part on network or management policies is referred to as policy based configuration (PBC). One or a plurality of policies may be utilized in selecting, generating, or otherwise determining the configuration information or data set to be sent to a particular network device (the primary network device) and such policy or policies may also be used to determine the configuration information or data set sent via a particular network (a primary network device) to other devices, possibly including other network devices (secondary devices or secondary network devices), that are connected with or coupled to the network device. As an example, a access point device is a secondary network device to a network switch which is a primary network device.

Both identity-based configuration and policy-based configuration share some common structural, functional, and operational aspects so that to the extent possible, both will be described together with differences described as required. It will however be apparent that the policy-based configuration approach has some distinct advantages over identity-only based approaches. It is believed that this descriptive approach will provide the reader with the best understanding inventive aspects as well as an appreciation for variations that the techniques described in this paper support.

Recall that with reference to the example of FIG. 1, an implementation includes two principal hardware components, a network device 108 that requires configuration information 126, and the server 104 or other source of configuration information 107 that the network device 108 can contact over a communications link 124 such as the Internet or other network to request 122 configuration information 124 stored (for example based on a device identity) or generated (for example, based on predetermined or dynamically determined policies) at the server so that it can be sent over the communication link to the particular network device 108 making the request.

FIG. 3 is an illustration showing an embodiment of a wireless network device having a recessed mode selector button exposed on an outer surface of the switch so that a person may either leave the switch in a first position to maintain a persistently stored configuration in the device or to press the button during a power-on, boot, or other reset procedure to cause the device to request a new configuration data or information.

With reference to FIG. 3, an alternative embodiment to the system illustrated in FIG. 1 is shown having additional management system 204 and device 108 detail shown. The FIG. 3 embodiment includes structures that may in some instances only operate or be present with the identity-based configuration (IBC) such as the configuration storage database and look-up table, or only with the policy-based configuration (PBC) embodiment such as the configuration and policy-based configuration generator 210 so that either of these may be seen as being optional elements; however in some implementations both are present so that the network administrator has several options and flexibility to choose the option that best suits the network device configuration at the time. It may also be noted that the system and device may optionally provide for manual configuration of any network device through either the server or through a local interface to the device.

Figure 4:
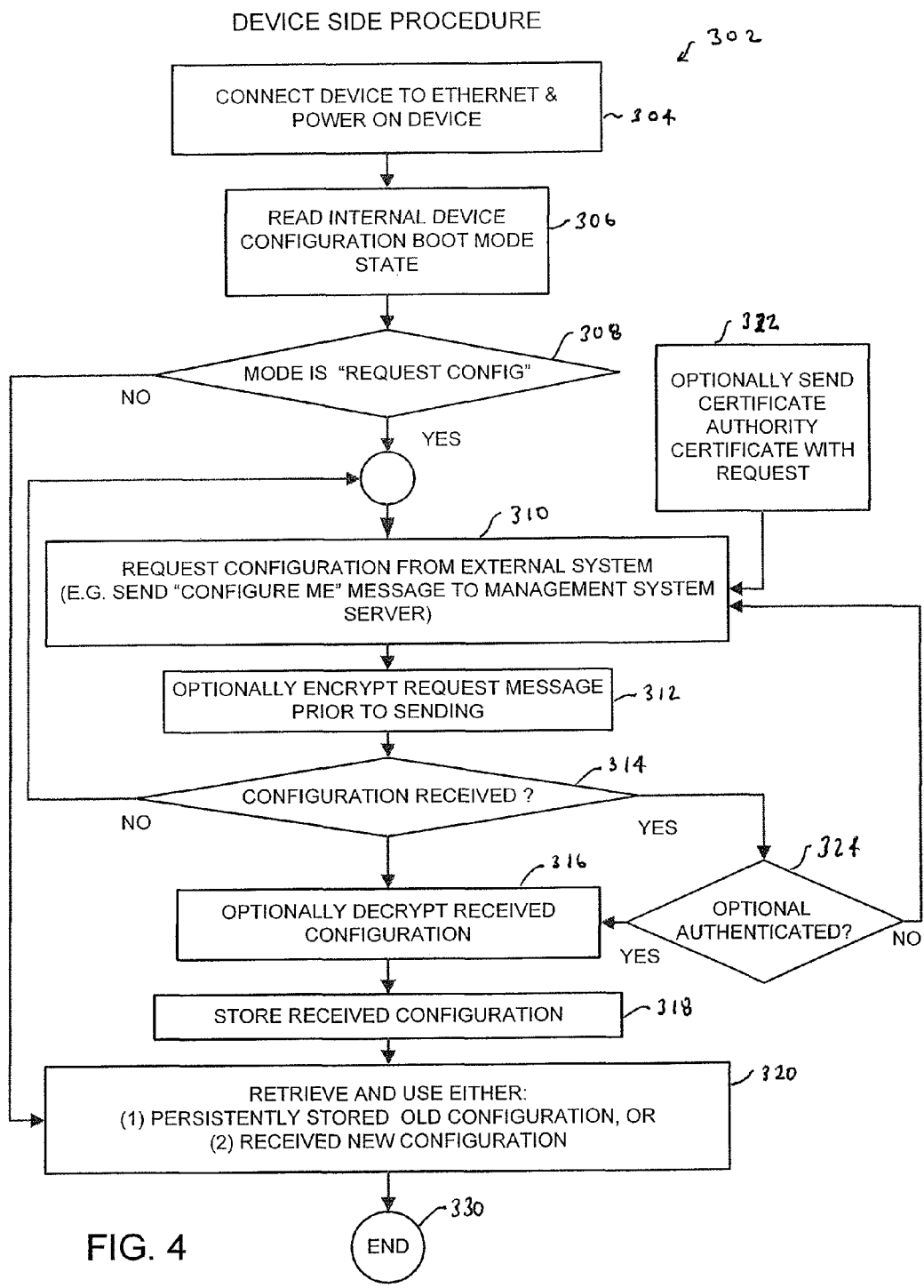
FIG. 4 is an illustration showing an embodiment of an exemplary management side procedure for causing a valid configuration to be retrieved from a storage in the management side server or generated by the management side server and sent to the remote network device.

An embodiment of the inventive method for configuring a device is now described from the perspective of the network device 108 relative to FIG. 4. As described earlier, one of the benefits of the inventive system device and method is ability to connect and configure a network device to the network without the involvement of a skilled or trained IT administrator. It may be desirable to configure a network device with the only requirements to connect the physical network device to the network such as to the Ethernet and to power on the device (step 304). Next, the procedure reads the internal device configuration boot mode state (step 306). The boot mode state determines whether the network device 108 already has and stores a configuration information that the device wants to retain and utilize or that the network device 108 has no configuration information or wishes to obtain an updated or new configuration information. In an implementation, the boot mode state is a flag, bit, byte, or any other indicator capable all of identifying a first and second states. If the indicator identifies a first state then the device will take actions to request and obtain new configuration information from an external source such as the management system 204 side server 206. However, if the indicator identified the second state then the device will not request configuration information and will retain the configuration information it already has and stores.

When the boot mode state indicator is in the second state indicating that the device does not needed to obtain updated our new configuration information device side procedure 302 provides that the network device 108 is ready to operate on the network and uses they persistently stored old configuration information for continued operation in the network (step 320) and a device side procedure ends (step 330).

When the boot mode state indicator is in the second state indicating that the device needs to obtain initial, updated, or new configuration information and request for configuration from the actual system is sent (step 310). In an implementation, the request for configuration is sent using a "configure me" message to the management systems side server 206. Optionally, but advantageously communications between the network device 108 and the management system 204 are conducted using certificate based or other authentication (step 322) as well as encryption 312 (at least for sensitive information) for the messages passed between the network device and the management side system.

It may be appreciated that authentication (step 322) and encryption (step 312) are important for maintaining a secure network because the configuration information itself as well as the protocols used on the network contain or may contain secret information such as keys and the like that if intercepted and known by others would subject the network to attack and compromise. It will however be appreciated that neither authentication nor encryption are required for operation of the inventive system, device, or method and that they are optional features a prudent network architecture and administrator would implement to protect the network.

There is authentication and encryption that can be enabled in a mutual sense. For example, mutual authentication on both sides can prevent someone outside coming in and sucking down configuration data from the management server. The management side server uses a certificate based authentication of the network device to make sure that only network devices that are trusted by the management server based on the certificate authority certificate are allowed in to talk to or otherwise communicate with the management server and more particularly to request the configuration information by sending the "configure me" message to the server. On the reverse direction (when the management system talks to the network device), an encryption based on secure socket layer (SSL) may be used and in this case an authentication based on a username and password scheme may be implemented to make sure the management scheme that is configuring the network device is allowed to do so. This may be done by an administrator once so that the management system already knows what the credentials are for the management system to be able to securely configure the network device. Therefore, it will be appreciated that not only does the inventive system, device, and method provide for a great deal of flexibility in the configuration of network devices, but it may also operate in an environment were security is maintained and mutual server/device authentication with encryption on all or a defined subset of the messages may be provided.

The network device 108 will then wait for the management systems side server 206 to respond and said the requested configuration information. It may be noted that the management systems side server 206 may store the configuration information 208 in the same form or in a somewhat different form they and the form in which it is communicated to network device 108 and that network device 108 may yet and still store the received configuration information and a different form or format band that in which it was received. The management system 204 may also or alternatively have and store different configuration information from which the configuration information that is sensed two and Stored by network device 108 is derived. Independent of possible differences between the configuration information available for a network device on the management systems side server 206 and the configuration information stored and used by network device 108, it will be appreciated that the configuration information received by and stored within the network device completely satisfies its need for configuration information so that the network device is able to operate in its intended manner on the network.

In the event that the configuration information requested is not received within a predetermined time inventive device side procedure 302 may submit a new request or query for the information (step 314) and continued to monitor receipt of the requested configuration information and/or make new request for the configuration information until that request is satisfied. The device side procedure 302 may also optionally but advantageously require authentication (step 324) from the server for any configuration information received, and may require decryption when the configuration information and/or accompanying message were encrypted. Encryption, decryption, and certificate authority based authentication procedures are known in the art and are not described in additional detail here.

Once the configuration information has been received the configuration information is stored (step 318) into a memory or other storage in the network device 108. Subsequently, the configuration information may be retrieved and used as required for operation of the network device (step 320), and the device side procedure 302 and (step 330).

Figure 5:
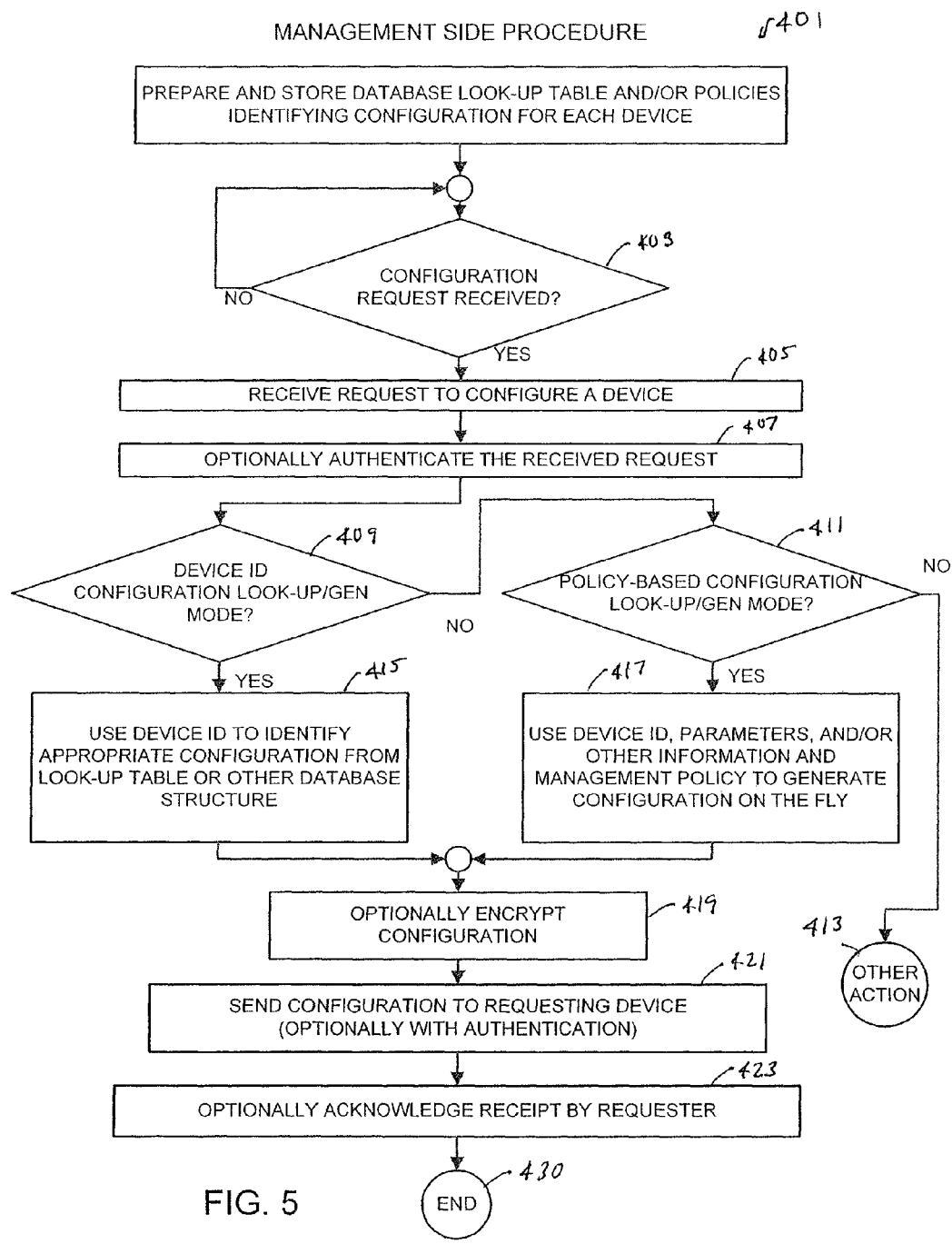
FIG. 5 is an illustration showing an embodiment of an exemplary network device side procedure for causing a valid configuration to be received by and stored in the remote network device.

The corresponding management side procedure 401 is now described relative to FIG. 5. It'll be understood that prior to the management side system 204 having an ability to serve or otherwise send or communicate the configuration information to the requesting network device, the configuration information must be available on the management systems side server 206 (except that according to an alternative embodiment, the configuration information may be generated on-the-fly or in real-time or substantially in real-time upon receiving the request). Therefore the management side procedure 401 includes the step of preparing and storing a database, which may be a lookup table database, that identifies the configuration information for each physical network device ID (step 401).

In the alternative embodiment where configuration information is determined or provided based on network policies, the database for example may include or utilize one or plurality of policies that are used to provide or generate an appropriate configuration information for a requesting network device based on the network policies and parameters associated with the requesting network device. For example, parameters that may be used in conjunction with policies might include, but are not limited to, and location parameter, a device type parameter, a device class parameter, an office or location specific function parameter, or any other parameter or characteristic of the network device, network device site, network device location, or any combination of these parameters, it may be used in conjunction with policy to determine the most appropriate configuration information to retrieve from a storage or to generate on-the-fly for use by a network device.

The network having either stored network device configuration information prior to receiving request, or having an ability to generate an appropriate network device configuration for a requesting network device is in a position to send, preferably and a push mode to the requesting the network device, configuration information to the network device once a configuration quest has been received (step 403). Therefore, the server essentially waits in a loop for configuration request to be received (step 403), and when a receives requests to configure a device (step 45) it may optionally authenticate the received request (step 407) and then determine if the requesting device should be sent a configuration information based on a network device identity ID (step 409) or based on a network policy (step 411). For either the identity-based configuration (IBC) or the policy-based configuration (PCB) the configuration information to be provided may be either obtained by a database lookup procedure or by a configuration information generation procedure where the generation is performed only upon receipt of the configuration information request.

Identity-based configuration (IBC) uses an identifier that is unique to the device to identify an appropriate configuration either from an existing database that has been generated receiving the request for configuration, or to generate an appropriate configuration for the requesting device after the request for configuration information has been received by the server. In one embodiment, the policy-based configuration (PBC) primarily relies upon one or more pre-defined or dynamically determined policies that specify how for example different network device types, classes, or other parametrically defined groups of network devices are to be configured in a consistent (or even different) manner when deployed or rolled out at for example, different office locations of a corporation, different functional groups within a corporation or business, or according to any other rule set or policies.

In one embodiment the unique identifier may be selected as one or any combination of identifiers selected from the set of identifiers consisting of a device serial number, an internet protocol IP address, a Media Access Control (MAC) address, a Service Set Identifier (SSID), and any combination of two or more of these.

Independent of the type of configuration information to be sent, the configuration information is optionally but advantageously encrypted so as to prevent unauthorized interception and access to the configuration information (which may include secret information such as keys, protocols, or the like)

by unauthorized parties (step 419). Finally, the management side system server sends the configuration information to requesting device (step 421) optionally but advantageously with authentication. Encryption and/or authentication are both particularly advantageous when any of the information may be communicated over an insecure link, for example over the Internet 120 or other unsecure or external communication infrastructure. Neither authentication nor encryption are required, though a prudent network administration would normally choose at least to encrypt and typically to require mutual management side and device side authentication.

The management side server may optionally wait for an knowledge receipt of the sent configuration information by the requester (step 423) and then the management side procedure for one and its (step 430).

In an implementation, a configuration success indication may optionally by advantageously be provided. In one embodiment, when the management side system receives the request for configuration from the remote network device, it immediately or within a predetermined period of time, transitions a management state of the remote network device such that a network operator, administrator, or other entity (human or machine) receives an indication of success or failure of the remote network device request. The end effect is that the operator will see the site have a first state (e.g., success state) or go "green" if the auto-configuration request and respond exchange was successful, or have a second state (e.g., failure state) and go "red" if the request and respond exchange failed. In one embodiment, a network map may be generated and optionally displayed via a graphical user interface or other graphical, symbolic, or text showing the success or failure status of the network devices. The management system also optionally provides a list of failed remote requests and allows the user to diagnose these.

In an implementation, where a plurality of network devices may request configurations information from the management side configuration server 106, the management side configurations server may establish a queue so that requests for configuration information are placed into the queue in their order of receipt, and each request is handled serially so that the first configuration information request is placed at the head of the queue and for which configuration information is sent to the requesting network device first, then each request is handled in turn in their order of receipt. Other implementations may for example provide for some prioritization so that certain requests determined to have a higher priority are handled out of order relative to their order of receipt. Prioritization based on any number of factors may be implemented. For example, the server may be able to identify request for configuration it should receive a higher priority based on such indicators as the device identifier, the Internet protocol address from which the request was received, and/or other factors. The status of a configuration information request as a higher prior request could be known to the server without the server needing to decrypt, authenticate, or otherwise open or substantially process the requesting message in order to determine a priority status.

While the communication, download, or push of network device configuration information from the server to the network device has been described in general terms, the inventive system, device, and method provides additional utility and advantages where the network device is coupled with or can communicate with other network devices that also require configuration or configuration information.

For example, where the network device requesting configuration is coupled to the server and network device can receive the configuration information over that Ethernet connection. In addition, any secondary network devices that are connected to the requesting network device 108 which is referred to here as the primary network device, such secondary network devices may themselves receive their own configuration information from the primary network device and the request by any primary network device to the management side server may and in preferred embodiments will include a request for configuration information for any and all secondary network devices coupled with the primary network device.

In particular, where the primary network device making the original request for configuration information is a network switch, the management side server will not only provide configuration information for the network switch but also configuration information for access points (AP) or mobility points (MP) that are coupled or connected to (or maybe coupled or connected to) the primary network device or switch. This optional implied request for configuration information not only for the primary or requesting network device but also for the other secondary devices coupled with or connected to the primary network device may substantially reduce the number of requests made and the resulting burden on the network server 206.

The ability to acquire not only configuration information for the switch but also for access points connected to the switch at the same time means that the process of setting up and configuring an entire network much more efficient and vastly simplify as compared to any manual configuration or even answer a configuration which is performed by a network administrator remotely but in non-real-time or off-line. Furthermore, for implementations that generate either network device identity based or policy-based configuration information upon receipt of a request, the algorithms and procedures as well the policies on which network configuration information sets are generated may be done at any time prior to their need and do not require participation of either programmers or network administrators at the time or place where the network devices are being deployed or rolled out.

In each case, this means that as each network device is physically connected and powered on it may "call home" or otherwise contact a designated engine system side server 206 and requests its configuration information, and for a typical network receive its configuration information and have actual configuration of the network device and any secondary network devices coupled with or connected to that primary device completed within a matter of a few seconds. Even if a decision is made to completely connect all (for example 100 or more) of the network devices but not to power them on until some predetermined time, each of the network devices that have been configured to requests initial or new configuration information can send a message back to the system server in a secure manner and expect to have its request answered within a few to several minutes. The queuing mechanism at the server taking care of any concurrently received requests that are or may be received more closely in time than a response message with configuration information can be retrieved from the database and sent or generated and sent.

It will be apparent that such automated configuration provides for much quicker and cost efficient installation of not only a single network device (and possibly the secondary network devices that may be attached to that primary network device), but has particular advantages and efficiencies that scale to large numbers of new or replacement devices.

Recall that embodiments of the inventive network device 106 may include either or both a two-state button or switch that identifies the device as being in an "enable" or "disable" request configuration information on network device boot or power-on, and a software settable and resettable state than can represent either an "enable" or "disable" request configuration on boot or on power-on status for the network device.

In one embodiment, a button is provided in a recess or aperture within the housing or enclosure of the network device. The button is advantageously recessed so that it will not inadvertently be pressed during handling of the device during deployment of the device particularly if power is applied to the network device. Any type of button or switch may be used. In some implementations, the button may be recessed to such a depth that a small pointed object such as a paper-clip tip or wire is needed to access and alter the state of the button. In one embodiment the button need only be pressed momentarily during the power-on or boot-up while in other embodiments, the button should be held for from one to several seconds during the power-on or boot-up for its actuation to have the intended effect.

In one embodiment, the network device maintains its current configuration settings that are persistently maintained or stored non-volatility in the device unless the button 116 is depressed during power-on or boot-up of the device. The alternate default, wherein the network device 108 requests new configuration unless the button is pressed may alternatively be implemented in the device, but this default condition in not preferred because it would result in increased and unnecessary burden on the management side server 106.

The software or firmware set state may equivalently be used to cause the network device 108 to request configuration information for the device (and for other devices that attach to the network through the primary (requesting) device. In one embodiment, the boot mode state is set to enable (either at the time the network device is manufactured and loaded with its software/firmware, or in preparation for device deployment or installation) so that when the network device is installed and powered on for the first time it will request configuration. On subsequent boot-up or power-on the boot mode state is set to disable so that the configuration information that had previously been loaded into the network device will be retained. In one embodiment, the boot mode state is only changed from enable to disable when configuration information was successfully loaded into the device. In one embodiment, pressing the recessed button while powered on but not during the boot-up or power-on phase will reset the network device to a predetermined configuration, such as for example a factory default or reset condition.

It may be appreciated in light of the description provided here that either a database or look-up table based identity or policy-based configuration, a database or look-up table information may be input into the database or look-up table at any time in advance of the time the configuration information is actually needed or requested. Therefore the information may be placed into the database or look-up table in the hours, days, weeks, or months preceding rollout of a system. This placement or storage of information may be done in non-real time so that it does not require the dedicated attention of an IT or network administrator. The determination, placement, and storage of the information or any part of component of the information may also be done by a third party or contractor. Certain information that is sensitive in nature may be added to the database or look-up table by a trusted entity at a later time.

Certain other conventional systems and methods may at first seem to be able to partially self-configure to a local set by pressing a button on an external surface of a device. However such systems typically work by sensing 802.11 standard-compliant wireless signals that are locally present in the environment. Devices including wireless access point devices made by the same company as a company that makes a wireless router may under some conditions be able to communicate with the wireless router and based on the mutual communication between the wireless router device and the wireless access point device, determine settings by which the two devices can communicate. These system are not able to automatically send messages to a remote server over for example an Ethernet connection, request network configuration for themselves and optionally for other devices connected to them. Neither do such conventional devices or set-up methods provide the other features described herein.

It may be appreciated that at least because the network device sends a request to a designated server to receive configuration information, the entity that is responsible for defining the configuration information (such as for example an authorized corporate network administrator) that is to sent to each network device (no matter whether pre-stored in an existing database or generated upon receiving the request) may chose the most appropriate configuration information at the time. Furthermore, the configuration information may be changed at the server from time to time as required or desired. Additionally, the network devices may themselves be controlled in a manner that new network device configuration information may be pushed or downloaded into the device as changes are required or desired, or the server or other entity may communicate a message or command to direct the network device to request updated, changed, or replacement configuration when they are next booted, or at a particular date and time, or according to other criteria.

One situation where the management side server may desire to alter an existing and operating network device is when the network device may have initially obtained a network IP address from a Dynamic Host Configuration Protocol mechanism or DHCP. DHCP is a protocol that assigns a dynamic IP address to a device on a network and can even support a mixture of static and dynamic IP addresses.

In some instances the existence of a network device using a DHCP based IP address may be problematic, or even when not problematic, there may be a desire for all network devices on a network to operate with a fixed IP address. Therefore, in one implementation the management side system configuration server may act to assign a fixed IP address to a requesting network device event when the network device is behaving properly and without problem with its DHCP based IP address. (It is also possible to permit a network device having a fixed IP address to acquire a DHCP IP address, but this scenario is not of particular interest here).

In one implementation, the network device communicates a request for configuration information to the server and the server receives that request in the manner described elsewhere in this specification. The management side system may then examine certain fields, statements, or other data or indicators of or within the request message (or any attachment to the request message) to look at certain fields of the request. These fields may for example include any one or combination of: a current IP address that the device is on, and an indicator that identifies whether the device has obtained its current IP address from DHCP or by static IP address configuration. If the management side system determines that the requesting network device has a static IP address and it wants the network device to continue to have a static IP address, then it may take no action so that static address remains unchanged or it may assign a different static IP address that will be communicated to the network device with its requested configuration information and used subsequently by the network device and the management side (including the management side server) for their communication. On the other hand if the management side system determines that the requesting device is using a DHCP address and wants the network device to use a static IP address, it may send (to the DHCP IP address) the desired new static IP address for use by the requesting network device in the configuration information. The new static IP address will thereafter be used for communications between the network device and the management side server or other entities on the network.

There is considerable flexibility for either a signal network device or a multiplicity of network devices to find an IP address such as using DHCP that will permit them to first come up on a network and to send and receive network messages, without them remaining tied to a particular IP address or to a dynamically determined IP address, and then have their IP address changed for example to a management side static IP address to suit the management side systems preferences. The system and method therefore also include a management side intelligent component that for example permits the management side to recognize that an initial message (or even subsequent message) came to the management side server using a particular DHCP based IP address, sends out new network device configuration information to the requesting device using the then current particular DHCP based IP address, and then updates its records or information so that it will conduct future communications with the network device using the newly assigned static IP address that was included in the configuration information.

Attention is now directed to some other and/or additional characteristics and features of the inventive network device.

The network device itself (such as for example in a wireless network switch device), when it boots up, has to recognize when to go and request and then get its configuration information and when not to go get it. Advantageously, the network device may not want to go and get the configuration again on every boot (although this operation is not precluded) or after every power failure that may occur. While this may not present any issues for either the device itself or the network or server, if every one of perhaps 200 network devices in a facility were to request new configuration information after a momentary power failure on a hot summer day, it would add to the network traffic burden on the network and on the processing and/or other content serving by the server. In order to handle this the network device booting or power-up situation, a small button, toggle, switch or other means for altering a state between a request configuration information first state (enable) and a do not request configuration information second state (disable) which when placed in a first position (such as being pressed or depressed) while booting will initiate the special booting sequence or program that retrieves the device configuration. When placed in a second position (such as by being left in a non-pressed or extended position) does not initiation a booting sequence, or bypasses program code, that would otherwise request configuration information form an external source. This allows the network device, such as a switch to either use its existing configuration data set, or reset and fetch and obtain a new configuration data set ("config") at any point or time. Note that computer program software commands may be used to alter the state of a stored flag, token, data item, or other logic to affect the same function as the physical switch.

Furthermore, but optionally, if there is a network administrator or other person or entity available that may be able to understand and make changes to the network device program or data stored within the network device either before the network device is sent to the installation site (pre-shipment boot mode setting) or at the installation site (pre-installation boot mode setting), that person can utilize a command line interface (CLI) to set the network device into the automated configuration request mode (e.g., "configure me" or "drop-ship" mode versus a retain existing configuration mode) so that the need to press a button during the power-on and automatic boot procedure is removed and it is only necessary to connect a network connection (such as for example an Ethernet cable) and apply electrical power, and otherwise the auto-configuration is completely automated and touchless. In other words, the there is an equivalent mechanism in software within the network device that sets the boot mode or results in execution of software and/or firmware to execute in the network device (such as in a processor, ASIC, or other logic of the network device) of the button pressing mechanism. For example, in one embodiment there is a specific software command, such as "set autoconfig=enable", and once this is set and the network device is booted with this autoconfig=enable set, the network device will request configuration information on that first boot. After this first boot after the auto configuration is enabled, the mode is returned to disable so that subsequent power-on will not result in new configuration information requests. As described elsewhere herein, this means that when the autoconfig="enable" is set before shipping a replacement network device to a remote location where no or minimal technical support is available, it is only necessary to substitute the replacement unit for the failed unit, including unplugging and replugging a simple Ethernet cable and power cable. When the replacement unit is powered on it will sense the autoconfig=enable mode that has been set in the device, and cause the replacement network device to get its own configuration information from the network. The person performing th e replacement need have no technical knowledge or idea of what is happening. It is essentially as simple as plugging in a standard telephone handset.

In one embodiment, once it has retrieved its configuration information, data, or file, this autoconfig setting is disabled so that the next time it boots it need not go out and request its configuration again. In another embodiment, once the autoconfig is set to enable, it holds this setting until changed or reset so that the device will request its configuration each time it boots. This approach is not preferred as it would unnecessarily increase the burden on the network and the server.

A computer program and computer program product can include a program module having instructions and optional data and/or parameters for execution in a processing logic to carry out the inventive methods and procedures described herein. For example, the methods described herein and illustrated for example in FIG. 2, FIG. 4, and FIG. 5 may be performed as software executing within a processor or processing logic of the network device (device side procedure), with a processor or processing logic of the management side such as by a management side server computer (management side procedure), or by a combination of both of these. A variety of types of processors, microprocessors, ASICs, and associated or coupled memory may be utilized in the management side server and network device to accomplish the required processing tasks.

In one implementation the protocol used for the communications between the network device and the management side server is an XML-based protocol over http. The inventive scheme may also or alternatively be used with different language or protocol, such as for example, but not limited to a SNMP, CMET or any other protocol and need not be performed with or limited to XML.

Figure 6:
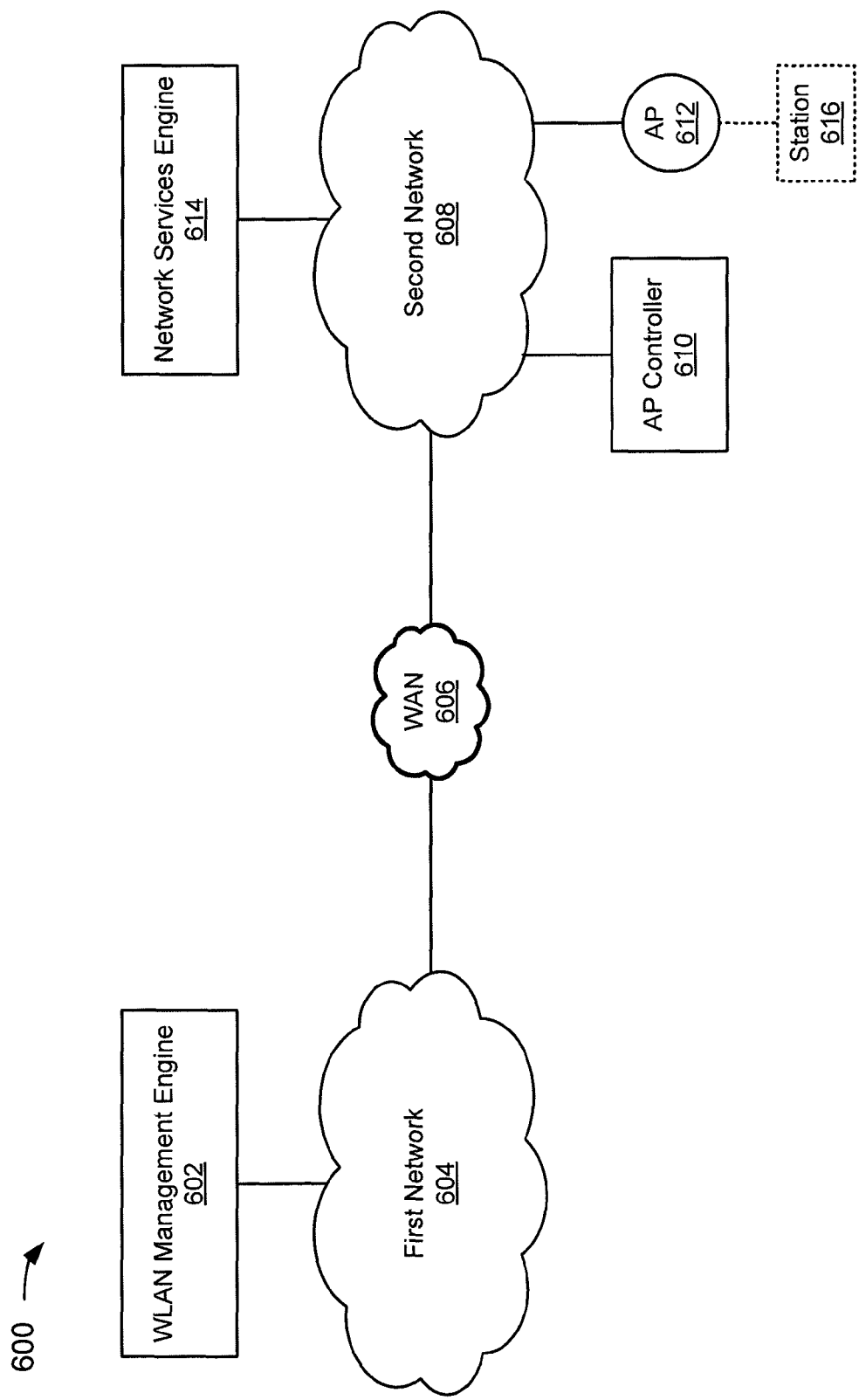
FIG. 6 depicts an example of a system having partially autonomous local network devices associated with wide-area WLAN policy.

FIG. 6 depicts an example of a system 600 having partially autonomous local network devices associated with wide-area WLAN policy. The system 600 includes a wireless local area network (WLAN) management engine 602 coupled to a first network 604. In an embodiment in which the first network 604 includes a wireless network, the WLAN management engine 602 can manage network devices, such as wireless switches and access points (APs) on the first network 604.

In the example of FIG. 6, the first network 604 is coupled to a wide area network (WAN) 606. The WAN 606 can include by way of example but not limitation the Internet. The term "Internet" as used in this paper refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well-known to those of skill in the relevant art. The WLAN management engine 602 is capable of wide-area WLAN management if it is able to manage WLANs across the WAN 606.

In the example of FIG. 6, a second network 608 is coupled to the first network 604 through the WAN 606. An AP controller 610, an AP 612, and network services engine 614 are coupled to the second network 608. These components can colloquially be referred to as "on" the second network 608. In an implementation in which the WLAN management engine 602 is capable of wide-area WLAN management, the WLAN management engine 602 can manage one or more of the network devices on the second network 608. The network devices on the second network 608 can be referred to as "partially autonomous" if the WLAN management engine 602 gives some autonomy to the network devices to operate without, e.g., authenticating at the WLAN management engine 602. This can be advantageous in avoiding delay across the WAN 606, particularly if connectivity is lost for some reason (due to issues with the first network 604, the WAN 606, the second network 608, the WLAN management engine 602, or other connectivity issues).

The AP controller 610 can include a wireless switch and "intelligence" for the AP 612. It is possible to include little or none of the functionality of the AP controller 610 in the AP 612; in such an implementation, the AP can be referred to as a "dumb AP." It is possible to include some or all of the intelligence of the AP controller 610 in the AP 612; in such an implementation, the AP can be referred to as a "smart AP." For APs that have all of the intelligence of the controller, it is not necessary to have a controller. Thus, the AP controller 610 could be considered "part of" the AP 612 in some cases. Some APs are "smarter" than others, depending upon the amount of functionality that could be put in a controller is put into the AP.

In an implementation, the AP controller 610 (and other network components, such as the AP 612, if applicable) is physically placed at a site associated with the second network 608. By "physically placed" what is meant is the second network 608 and the AP controller 610 are on a different side of the WAN 606 than the first network 604 and the WLAN management engine 602.

In an implementation, the AP controller 610 (and other network components, such as the AP 612, if applicable) is initially unconfigured when physically placed at the site associated with the second network 608. Electrical operating power is applied to the network devices to initiate execution of a computer program sequence, the computer program sequence generating a message that includes a network device identification information and a request that a configuration data set for the network device be sent from the WLAN management engine 602 to the network device over the WAN. The AP controller 610 (and other network components, such as the AP 612, if applicable) can have a unique identifier that is encoded or otherwise represented by an electronic signature or digital data. When the WLAN management engine 602 receives a request with the unique identifier, the WLAN management engine 602 provides configuration data appropriate for the identified network device across the WAN 606. Advantageously, once configured in this manner, traffic from the AP 612 to the second network 608 accessing network resources of the second network 608 need not utilize the WAN 606.

In the example of FIG. 6, the second network 608 can include a plurality of wireless transmit and/or receive nodes. One such node will be referred to as the AP 612 in this paper, though it should be recognized that terminology will vary depending upon the technology and/or implementation. For example, in an ad-hoc network the term "AP" is typically not used. For the sake of illustrative simplicity, since a person of skill in the relevant art will have no trouble in finding the relevant term in the Institute of Electrical and Electronic Engineers (IEEE) 802.11 standard, the current version of which is incorporated by reference, terms that are typically used in the 802.11 standard will be preferentially used in this paper when discussing wireless technology. It should be understood that different terminology may be used when referring to other wireless technology.

A station, as used herein, may be referred to as a device with a media access control (MAC) address and a physical layer (PHY) interface to the wireless medium that comply with the IEEE 802.11 standard. Since APs that comply with the 802.11 standard have these characteristics, an AP can normally be referred to as a station. Where it is desirable to draw a distinction between an AP and a non-AP station, the AP can be referred to as an "AP" and a station can be referred to as a "non-AP station." In general, a station can comply with any wireless standard or none at all, and may have any known or convenient interface to a wireless or other medium, though depending upon the standard, a station may be referred to as something other than a "station," and may have different interfaces to a wireless or other medium. Exhaustively listing every implementation of a station is difficult, but some examples include a laptop, a wireless telephone, portable digital assistant (PDA), a desktop computer, or any other applicable computing device capable of communication on a wireless network.

Depending upon the technology or implementation, an AP includes a hardware unit that acts as a communication hub by linking wireless mobile stations to a wired backbone network. This can, for example, enable APs to connect users to other users within the network and/or to serve as the point of interconnection between a wireless local area network (WLAN) and a fixed wire network. The number of APs that are desirable for a given implementation can depend upon the desired size of a wireless domain. For example, it may be desirable to locate the APs such that they cover the entire area/space of a wireless domain. The number of APs that are desirable for a given implementation can also depend upon whether data from the APs is used to get a snapshot of where stations, or a subset of the stations, are located within the wireless network; generally, the more APs, the better, though at some point there is likely to be diminishing returns. An implementation of an AP, provided by way of example but not limitation, includes a TRAPEZE NETWORKS® MOBILITY POINT® (MP®) AP. An implementation of a wireless domain, provided by way of example but not limitation, includes a TRAPEZE NETWORKS® SMART MOBILE® (TRAPEZE SMART MOBILE®) wireless domain.

In operation, an AP can typically transmit and receive data (and may therefore be referred to as a transceiver) using one or more radio transmitters. For example, an AP can have two associated radios, one which is configured for 5 GHz transmissions, and the other which is configured for 2.4 GHz transmissions. (Other bands are acceptable, too.) In a non-limiting embodiment, APs transmit and receive information as radio frequency (RF) signals to and from a wireless station over an Ethernet connection. APs can transmit and receive information to and from their associated wireless exchange switches. Connection to a second wireless exchange switch provides redundancy. An implementation of a wireless exchange switch, provided by way of example but not limitation, includes a TRAPEZE NETWORKS® MOBILITY EXCHANGE® (MX®) switch.

The network services engine 614 can provide network services to authorized stations that are coupled to the second network 608. For illustrative purposes, the WLAN management engine 602 is on a first side of the WAN 606, while the network services engine 614 is on a second side of the WAN 606, the same side as the AP controller 610 and the AP 612. This distinction is relevant because, in an implementation, network devices such as the AP controller 610 are configured by the WLAN management engine 602 in accordance with a wide-area (or "global") WLAN management system, but local network devices are at least partially autonomous after being configured. So traffic from the AP 612 to the second network 608 accessing network resources of the network services engine 614 do not utilize the WAN 606. In the example of FIG. 6, in operation, a station 616 accesses network resources of the network services engine 614 through the AP 612.

Figure 7:
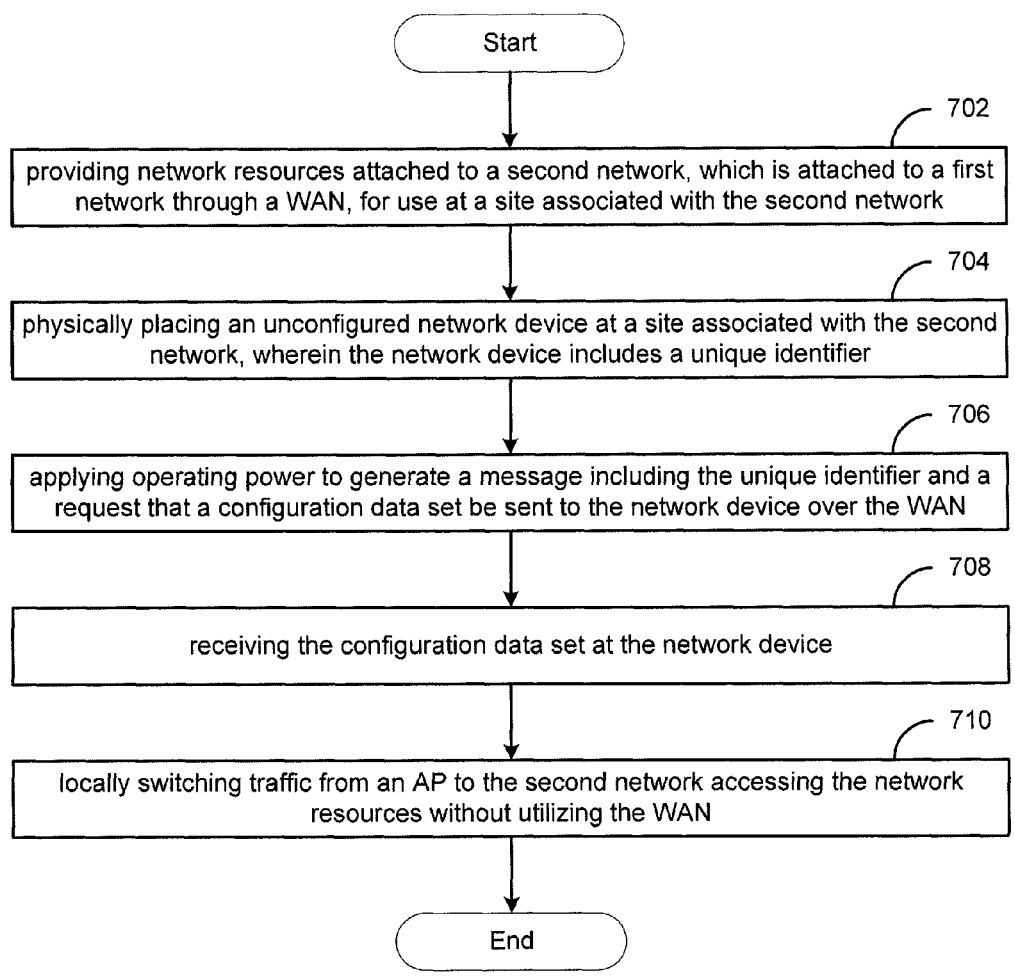
FIG. 7 depicts a flowchart of an example of a method for deployment of partially autonomous network devices.

FIG. 7 depicts a flowchart 700 of an example of a method for deployment of partially autonomous network devices. In the example of FIG. 7, the flowchart 700 starts at module 702 with providing network resources attached to a second network, which is attached to a first network through a WAN, for use at a site associated with the second network. The network resources may be provided by, for example, a network services engine.

In the example of FIG. 7, the flowchart 700 continues to module 704 with physically placing an unconfigured network device at a site associated with the second network, wherein the network device includes a unique identifier.

In the example of FIG. 7, the flowchart 700 continues to module 706 with applying operating power to generate a message including the unique identifier and a request that a configuration data set be sent to the network device over the WAN.

In the example of FIG. 7, the flowchart 700 continues to module 708 with receiving the configuration data set at the network device. Advantageously, modules 706 and 708 facilitate wide-area WLAN policy at a WLAN management engine coupled to the first network. Once the configuration data set is received, the network device can configure itself in accordance with wide-area WLAN policy. It can then operate at least partially autonomously with respect to the WLAN management engine.

In the example of FIG. 7, the flowchart 700 ends at module 710 with locally switching traffic from an AP to the second network accessing the network resources without utilizing the WAN. By locally, what is meant is that the traffic is switched on the second network; there is no need to send traffic up to the WLAN management engine through the WAN.

Unless the context clearly requires otherwise, throughout the description and the claims, the words "comprise," "comprising" and the like are to be construed in an inclusive sense as opposed to an exclusive or exhaustive sense; that is to say, in a sense of "including, but not limited to." Words using the singular or plural number also include the plural or singular number, respectively. Additionally, the words "herein," "above," "below," and words of similar import, when used in this application, shall refer to this application as a whole and not to any particular portions of this application.

The above detailed description is not intended to be exhaustive or to limit the invention to the precise form disclosed above. While specific embodiments of, and examples for, the invention are described above for illustrative purposes, various equivalent modifications are possible within the scope of the invention, as those skilled in the relevant art will recognize. For example, while steps are presented in a given order, alternative embodiments may perform routines having steps in a different order. The teachings of the invention provided herein can be applied to other systems, not only the systems described herein. The various embodiments described herein can be combined to provide further embodiments. These and other changes can be made to the invention in light of the detailed description.

All the above references and U.S. patents and applications are incorporated herein by reference. Aspects of the invention can be modified, if necessary, to employ the systems, functions and concepts of the various patents and applications described above to provide yet further embodiments of the invention. These and other changes can be made to the invention in light of the above detailed description. In general, the terms used in the following claims, should not be construed to limit the invention to the specific embodiments disclosed in the specification, unless the above detailed description explicitly defines such terms. Accordingly, the actual scope of the invention encompasses the disclosed embodiments and all equivalent ways of practicing or implementing the invention under the claims.

While certain aspects of the invention are presented below in certain claim forms, the inventors contemplate the various aspects of the invention in any number of claim forms. Accordingly, the inventors reserve the right to add additional claims after filing the application to pursue such additional claim forms for other aspects of the invention.

What is claimed is:

1. A method, comprising:
performing the following after power up of a wireless switch that is unconfigured or incompletely configured
(i) sending from the wireless switch a configuration information request message to an external source of configuration information on a first network over a Wide Area Network (WAN), and (ii) receiving at the wireless switch the configuration information from the source over the WAN in response to the configuration information request message, and (iii) storing at least a portion of the configuration information within the wireless switch, the wireless switch being connected to a second network that is coupled to the first network through the WAN, the configuration information including configuration information for the wireless switch and for an access point (AP) coupled to the wireless switch, such that the wireless switch is permitted to connect with the second network using the configuration information stored in the wireless switch and such that traffic from the AP to the second network accessing at least one network resource connected to the second network does not utilize the WAN.

2. A method, comprising:
sending from an unconfigured wireless switch across a Wide Area Network (WAN) to a Wireless Local Area Network (WLAN) management system a request for switch configuration data, the WAN coupling a first network to a second network, the WLAN management system connected to the first network, the wireless switch connected to the second network;

receiving at the wireless switch a single response to the request, from the WLAN management system based on the request, the single response including switch configuration data;

storing the switch configuration data at the wireless switch; and configuring the wireless switch based on the switch configuration data such that the wireless switch switches traffic from an Access Point (AP) to the second network accessing network services and the wireless switch does not utilize the WLAN, the AP and the network services being connected to the second network at a site associated with the second network.

3. The method as in claim 2, wherein a single request for switch configuration data is sent by the unconfigured wireless switch.

4. A method, comprising:
sending, from a wireless switch over a Wide Area Network (WAN) to a network device management server connected to a first network, a request for a plurality of configuration data sets, the WAN connecting the first network to a second network, the request including unique identifiers for network devices to be configured that are located at a site associated with the second network, and the unique identifiers include identifiers for at least the wireless switch and an Access Point (AP);

receiving at the wireless switch from the network device management server, a single response having a configuration data set including a plurality of configuration data sets, each configuration data set from the plurality of configuration data sets being associated with one of the unique identifiers for the network devices to be configured; and loading at the wireless switch the configuration data set into a non-transitory non-volatile configuration storage within the wireless switch, thereby configuring the wireless switch while in a request configuration state such that once the wireless switch is configured, traffic from the AP to the second network accessing network resources does not utilize the WAN, the network resources being connected to the second network for use at the site associated with the second network.

5. The method as in claim 4 further comprising:
one or more of the unique identifiers for the network devices to be configured, included in the request for the configuration data set, includes information selected from a set of a device serial number, a device Internet protocol (IP) address, a device class, a device site, a device location, a netmask, a network identifier, a device type to be configured, a software version identifier, a firmware version identifier, a date of manufacture, a DHCP source indicator, a pre-configuration fixed address indicator, a serial identifier (SID), an IP address, a media access control (MAC) address, a service set identifier (SSID), and any combination of these;

the received configuration data includes configuration information that identifies attributes of users or client devices that are permitted to access the network device from or through the wireless switch; and deriving at the wireless switch from the single configuration data set configuration information defining relationships between the wireless switch and other devices on the network.

6. The method as in claim 4, further comprising:
identifying at the wireless switch a receiver uniquely identified in a persistent non-volatile memory coupled to the wireless switch; and finding at the wireless switch a network device management server on the first network by sending a message to the uniquely identified receiver.

7. The method as in claim 4, further comprising:
sending the configuration data set request in accordance with a mutual authentication and encryption/decryption policy; and receiving the configuration data set in accordance with the mutual authentication and encryption/decryption policies;

the mutual authentication policy including the exchange of user identity and passwords;

the encryption/decryption policy involving the use of a key.

8. The method as in claim 4, further comprising:
changing a first state of a switch selected from the group including of a physical hardware switch, a physical button that is pressed down when the wireless switch is booted, a physical button that is pressed down when the wireless switch is powered on, a logical switch, and a software switch, such that changing the state of the switch to a first state activates the request configuration data set state; and changing the state of the switch to a second state activates a do-not-request configuration data set state.

9. A method, comprising:
receiving, at a device on a first network coupled to a Wide Area network (WAN), from a wireless switch on a second network that is coupled to the WAN, a request for a configuration data set including a device identifier associated with the wireless switch;

selecting or generating at the device a single response having a policy-based configuration data set for the wireless switch based on the device identifier;

sending the single response from the device, in response to the configuration data set request, to the wireless switch such that at least a portion of the data set is stored at the wireless switch and the wireless switch is configured to locally switch traffic on the second network without using the WAN, based on the configuration data set.

10. The method as in claim 9, wherein the configuration data set is stored in a configuration database in association with the device identifier;

the method further comprising performing at the device a configuration database look up in accordance with at least one network configuration policy and the device identifier.

11. The method as in claim 9, further comprising storing the configuration data set in a network device management server in an off-line or local mode without requiring the wireless switch be connected to the second network.

12. The method as in claim 9, wherein the configuration data set is associated with a policy applicable to the wireless switch and an operating environment of the wireless switch.

13. The method as in claim 9, wherein the configuration data set includes an indication of whether a configuration information source was received from DHCP or from a pre-configuration of the wireless switch, the indication being used when the configuration data set is sent to the wireless switch.

14. The method as in claim 9, wherein a single request for a configuration data set is received from the wireless switch.

15. The method as in claim 9, wherein the wireless switch is configured without human network administrator intervention.

16. An apparatus, comprising:
a non-transitory non-volatile storage configured to store a device identifier and a receiver identifier;
a logic circuit configured to have a programmable logic state, such that a first state identifies the apparatus as requesting a new policy-based configuration and a second state identifies the apparatus as maintaining configuration persistently stored in the wireless switch; and
a communications interface configured to, when the apparatus is in the first state:
   send across a Wide Area Network (WAN) to a remotely located external device associated with the receiver identifier a request for a configuration data set, the request including the device identifier, the remotely located external device being on a first network;
   receive a single response having a configuration data set associated with the device identifier from the remotely located external device in response to the request; and
   store at least a portion of the configuration data set at the apparatus such that the apparatus is configured automatically such that the apparatus provides sufficient switching functionality to enable traffic from a local access point (AP) to access local network resources on a second network without using the WAN, the first network being coupled to the second network through the WAN.

17. The apparatus as in claim 16, wherein the logic circuit is coupled to a two position switch configured to change the logic state.

18. The apparatus as in claim 16, wherein a single request for a configuration data set is sent to the remotely located external device.

19. The apparatus as in claim 16, wherein the apparatus is configured without local human administrator intervention.

* * * * *